(12) United States Patent
Circlaeys et al.

(10) Patent No.: US 10,324,973 B2
(45) Date of Patent: Jun. 18, 2019

(54) KNOWLEDGE GRAPH METADATA NETWORK BASED ON NOTABLE MOMENTS

(71) Applicant: Apple Inc., Cupertino, CA (US)

(72) Inventors: Eric Circlaeys, Paris (FR); Kevin Bessiere, San Francisco, CA (US); Kevin Aujoulet, Paris (FR); Killian Huyghe, Paris (FR); Guillaume Vergnaud, Tokyo (JP); Benedikt Hirmer, Paris (FR)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 15/391,276

(22) Filed: Dec. 27, 2016

(65) Prior Publication Data

US 2017/0359236 A1 Dec. 14, 2017

Related U.S. Application Data

(60) Provisional application No. 62/349,109, filed on Jun. 12, 2016, provisional application No. 62/349,092, (Continued)

(51) Int. Cl.
*G06F 16/41* (2019.01)
*G06F 16/48* (2019.01)
(Continued)

(52) U.S. Cl.
CPC .......... *G06F 16/41* (2019.01); *G06F 16/487* (2019.01); *G06F 16/489* (2019.01); *G06F 16/51* (2019.01);
(Continued)

(58) Field of Classification Search
CPC .......... G06F 17/3002; G06F 17/30268; G06F 17/3028; G06F 17/30044; G06F 17/30041;
(Continued)

(56) References Cited

U.S. PATENT DOCUMENTS

| 5,416,895 A | 5/1995 | Anderson |
| 5,565,888 A | 10/1996 | Selker |

(Continued)

FOREIGN PATENT DOCUMENTS

| CN | 1404233 A | 3/2003 |
| CN | 1717918 A | 1/2006 |

(Continued)

OTHER PUBLICATIONS

US 2002/0018582 A1, 02/2002, Hagiwara (withdrawn)
(Continued)

*Primary Examiner* — Ranodhi Serrao
(74) *Attorney, Agent, or Firm* — Blank Rome LLP

(57) ABSTRACT

Techniques of generating a knowledge graph metadata network (metadata network) for digital asset management (DAM) are described. A DAM logic/module can obtain one or more first metadata assets describing characteristics associated with digital assets (DAs) in the DA collection. The DAM logic/module can also determine second metadata asset(s) and third metadata asset(s) describing characteristics associated with DAs in the DA collection based on the first metadata asset(s). The DAM logic/module can generate at least some of the metadata assets as nodes in a metadata network associated with the DA collection. The DAM logic/module can also determine, for at least two of the metadata assets, a correlation between the at least two metadata assets. The DAM logic/module can generate an edge in the metadata network between the nodes that represent the at least two metadata assets to represent the determined correlation.

18 Claims, 11 Drawing Sheets

Related U.S. Application Data filed on Jun. 12, 2016, provisional application No. 62/349,094, filed on Jun. 12, 2016, provisional application No. 62/349,099, filed on Jun. 12, 2016.

(51) Int. Cl.
| | | |
|---|---|---|
| *G06F 16/51* | (2019.01) | |
| *G06F 16/58* | (2019.01) | |
| *H04L 12/26* | (2006.01) | |
| *G06F 16/487* | (2019.01) | |

(52) U.S. Cl.
CPC ........ *G06F 16/5866* (2019.01); *H04L 43/045* (2013.01); *H04L 43/16* (2013.01)

(58) Field of Classification Search
CPC ...... G06F 16/41; G06F 16/487; G06F 16/489; G06F 16/51; H04L 43/16; H04L 43/045
See application file for complete search history.

(56) References Cited

U.S. PATENT DOCUMENTS

| | | |
|---|---|---|
| 5,604,861 A | 2/1997 | Douglas |
| 5,677,708 A | 10/1997 | Matthews, III |
| 5,757,368 A | 5/1998 | Gerpheide |
| 5,784,061 A | 7/1998 | Moran |
| 5,825,349 A | 10/1998 | Meier |
| 5,956,035 A | 9/1999 | Sciammarella |
| 5,973,694 A | 10/1999 | Steele |
| 6,073,036 A | 6/2000 | Heikkinen |
| 6,237,010 B1 | 5/2001 | Hui et al. |
| 6,252,596 B1 | 6/2001 | Garland |
| 6,279,018 B1 | 8/2001 | Kudrolli et al. |
| 6,301,586 B1 | 10/2001 | Yang et al. |
| 6,334,025 B1 | 12/2001 | Yamagami |
| 6,351,556 B1 | 2/2002 | Loui |
| 6,441,824 B2 | 8/2002 | Hertzfeld |
| 6,452,597 B1 | 9/2002 | Goldberg |
| 6,477,117 B1 | 11/2002 | Narayanaswami |
| 6,606,411 B1 | 8/2003 | Loui |
| 6,686,938 B1 | 2/2004 | Jobs |
| 6,741,268 B1 | 5/2004 | Hayakawa |
| 6,784,925 B1 | 8/2004 | Tomat |
| 6,915,011 B2 | 7/2005 | Loui |
| 6,920,619 B1 | 7/2005 | Milekic |
| 7,015,910 B2 | 3/2006 | Card |
| 7,139,982 B2 | 11/2006 | Card |
| 7,164,410 B2 | 1/2007 | Kupka |
| 7,178,111 B2 | 2/2007 | Glein |
| 7,325,198 B2 | 1/2008 | Adcock |
| 7,421,449 B2 | 9/2008 | Williams |
| 7,434,177 B1 | 10/2008 | Ording |
| 7,587,671 B2 | 9/2009 | Saft |
| 7,627,828 B1 | 12/2009 | Collison |
| 7,636,733 B1 | 12/2009 | Rothmuller |
| 7,680,340 B2 | 3/2010 | Luo |
| 7,716,194 B2 | 5/2010 | Williams |
| 7,747,625 B2 | 6/2010 | Gargi |
| 7,788,592 B2 | 8/2010 | Williams |
| 7,823,080 B2 | 10/2010 | Miyajima |
| 7,831,100 B2 | 11/2010 | Gallagher |
| 7,843,454 B1 | 11/2010 | Biswas |
| 7,865,215 B2 | 1/2011 | Bells |
| 7,991,234 B2 | 8/2011 | Hamasaki |
| 8,024,658 B1 | 9/2011 | Fagans |
| 8,028,249 B2 | 9/2011 | Loui |
| 8,106,856 B2 | 1/2012 | Matas |
| RE43,260 E | 3/2012 | Paalasmaa |
| 8,200,669 B1 | 6/2012 | Iampietro |
| 8,305,355 B2 | 11/2012 | Matas |
| 8,339,420 B2 | 12/2012 | Hiraoka |
| 8,352,471 B2 | 1/2013 | Oami |
| 8,406,473 B2 | 3/2013 | Tanaka |
| 8,571,331 B2 | 10/2013 | Cifarelli |
| 8,698,762 B2 | 4/2014 | Wagner |
| 9,042,646 B2 | 5/2015 | Das |
| 9,123,086 B1 | 9/2015 | Freeland |
| 9,143,601 B2 | 9/2015 | Padmanabhan |
| 9,411,506 B1 | 8/2016 | Prado |
| 2002/0021758 A1 | 2/2002 | Chui |
| 2002/0054233 A1 | 5/2002 | Juen |
| 2002/0093531 A1 | 7/2002 | Barile |
| 2002/0168108 A1 | 11/2002 | Loui |
| 2003/0033296 A1 | 2/2003 | Rothmuller |
| 2003/0048291 A1 | 3/2003 | Dieberger |
| 2003/0090504 A1 | 5/2003 | Brook |
| 2003/0122787 A1 | 7/2003 | Zimmerman |
| 2004/0046886 A1 | 3/2004 | Ambiru |
| 2004/0119758 A1 | 6/2004 | Grossman |
| 2004/0125150 A1 | 7/2004 | Adcock |
| 2004/0143590 A1 | 7/2004 | Wong |
| 2004/0167898 A1 | 8/2004 | Margolus |
| 2004/0205504 A1 | 10/2004 | Phillips |
| 2004/0207722 A1 | 10/2004 | Koyama |
| 2004/0212617 A1 | 10/2004 | Fitzmaurice |
| 2005/0020317 A1 | 1/2005 | Koyama |
| 2005/0041035 A1 | 2/2005 | Nagatomo |
| 2005/0044066 A1 | 2/2005 | Hooper |
| 2005/0052427 A1 | 3/2005 | Wu |
| 2005/0062130 A1 | 3/2005 | Ciancio |
| 2005/0071736 A1 | 3/2005 | Schneider |
| 2005/0071767 A1 | 3/2005 | Kirkland |
| 2005/0073601 A1 | 4/2005 | Battles |
| 2005/0076056 A1 | 4/2005 | Paalasmaa |
| 2005/0102635 A1 | 5/2005 | Jiang |
| 2005/0104848 A1 | 5/2005 | Yamaguchi |
| 2005/0128305 A1 | 6/2005 | Hamasaki |
| 2005/0134945 A1 | 6/2005 | Gallagher |
| 2005/0160377 A1 | 7/2005 | Sciammarella |
| 2005/0183026 A1 | 8/2005 | Amano |
| 2005/0195221 A1 | 9/2005 | Berger |
| 2005/0275636 A1 | 12/2005 | Dehlin |
| 2006/0001652 A1 | 1/2006 | Chiu |
| 2006/0017692 A1 | 1/2006 | Wehrenberg |
| 2006/0025218 A1 | 2/2006 | Hotta |
| 2006/0026521 A1 | 2/2006 | Hotelling |
| 2006/0026536 A1 | 2/2006 | Hotelling |
| 2006/0036960 A1 | 2/2006 | Loui |
| 2006/0072028 A1 | 4/2006 | Hong |
| 2006/0077266 A1 | 4/2006 | Nurmi |
| 2006/0080386 A1 | 4/2006 | Roykkee |
| 2006/0088228 A1 | 4/2006 | Marriott |
| 2006/0090141 A1 | 4/2006 | Loui |
| 2006/0136839 A1 | 6/2006 | Makela |
| 2006/0155757 A1 | 7/2006 | Williams |
| 2006/0156237 A1 | 7/2006 | Williams |
| 2006/0156245 A1 | 7/2006 | Williams |
| 2006/0156246 A1 | 7/2006 | Williams |
| 2006/0265643 A1 | 11/2006 | Saft |
| 2007/0008321 A1 | 1/2007 | Gallagher |
| 2007/0016868 A1 | 1/2007 | Nurmi |
| 2007/0081740 A1 | 4/2007 | Ciudad |
| 2007/0115373 A1* | 5/2007 | Gallagher ......... G06F 17/30265 348/231.3 |
| 2007/0136778 A1 | 6/2007 | Birger |
| 2007/0152984 A1 | 7/2007 | Ording |
| 2007/0204225 A1 | 8/2007 | Berkowitz |
| 2007/0229678 A1 | 10/2007 | Barrus |
| 2007/0245236 A1 | 10/2007 | Lee |
| 2008/0030456 A1 | 2/2008 | Asadi |
| 2008/0057941 A1 | 3/2008 | Scott |
| 2008/0059888 A1 | 3/2008 | Dunko |
| 2008/0062141 A1 | 3/2008 | Chandhri |
| 2008/0091637 A1 | 4/2008 | Escamilla |
| 2008/0133697 A1 | 6/2008 | Stewart |
| 2008/0152201 A1 | 6/2008 | Zhang |
| 2008/0168349 A1 | 7/2008 | Lamiraux |
| 2008/0168402 A1 | 7/2008 | Blumenberg |
| 2008/0256577 A1 | 10/2008 | Funaki |
| 2008/0282202 A1 | 11/2008 | Sunday |
| 2008/0309632 A1 | 12/2008 | Westerman |
| 2009/0006965 A1 | 1/2009 | Bodin |
| 2009/0021576 A1 | 1/2009 | Linder |

(56) References Cited

U.S. PATENT DOCUMENTS

| | | |
|---|---|---|
| 2009/0063542 A1 | 3/2009 | Bull |
| 2009/0113350 A1 | 4/2009 | Rhino |
| 2009/0132921 A1 | 5/2009 | Hwangbo |
| 2009/0161962 A1* | 6/2009 | Gallagher .......... G06F 17/30247 382/203 |
| 2009/0210793 A1 | 8/2009 | Yee |
| 2009/0216806 A1 | 8/2009 | Feuerstein |
| 2009/0278806 A1 | 11/2009 | Duarte |
| 2009/0282371 A1 | 11/2009 | Curl |
| 2009/0287470 A1 | 11/2009 | Farnsworth |
| 2009/0300146 A1 | 12/2009 | Park |
| 2009/0307623 A1 | 12/2009 | Agarawala |
| 2009/0319472 A1 | 12/2009 | Jain |
| 2009/0325701 A1 | 12/2009 | Andres Del Valle |
| 2010/0045828 A1 | 2/2010 | Gallagher |
| 2010/0046842 A1 | 2/2010 | Conwell |
| 2010/0076976 A1 | 3/2010 | Sotirov |
| 2010/0083173 A1 | 4/2010 | Germann |
| 2010/0103321 A1 | 4/2010 | Ishikawa |
| 2010/0110228 A1 | 5/2010 | Ozawa |
| 2010/0114891 A1 | 5/2010 | Oami |
| 2010/0125786 A1 | 5/2010 | Ozawa |
| 2010/0150456 A1 | 6/2010 | Tanaka |
| 2010/0207892 A1 | 8/2010 | Lin |
| 2010/0287053 A1 | 11/2010 | Ganong |
| 2010/0302179 A1 | 12/2010 | Ahn |
| 2011/0025719 A1 | 2/2011 | Yanase |
| 2011/0035700 A1 | 2/2011 | Meaney |
| 2011/0050564 A1 | 3/2011 | Alberth |
| 2011/0050640 A1 | 3/2011 | Lundback |
| 2011/0099199 A1 | 4/2011 | Stalenhoef |
| 2011/0099478 A1 | 4/2011 | Gallagher |
| 2011/0126148 A1 | 5/2011 | Krishnaraj |
| 2011/0145275 A1 | 6/2011 | Stewart |
| 2011/0145327 A1 | 6/2011 | Stewart |
| 2011/0191661 A1 | 8/2011 | Phillips |
| 2011/0246463 A1 | 10/2011 | Carson, Jr. |
| 2011/0267368 A1 | 11/2011 | Casillas |
| 2011/0282867 A1 | 11/2011 | Palermiti, II |
| 2011/0320938 A1 | 12/2011 | Schorsch |
| 2012/0110438 A1 | 5/2012 | Peraza |
| 2012/0243735 A1 | 9/2012 | Wu |
| 2013/0022282 A1 | 1/2013 | Cooper |
| 2013/0040660 A1 | 2/2013 | Fisher |
| 2013/0061175 A1 | 3/2013 | Matas |
| 2013/0156275 A1 | 6/2013 | Amacker |
| 2013/0198176 A1 | 8/2013 | Kim |
| 2014/0046914 A1 | 2/2014 | Das |
| 2014/0055495 A1 | 2/2014 | Kim |
| 2014/0064572 A1 | 3/2014 | Panzer |
| 2014/0082533 A1 | 3/2014 | Kelley |
| 2014/0089330 A1* | 3/2014 | Cui .................. G06F 17/30997 707/749 |
| 2014/0143693 A1 | 5/2014 | Goossens |
| 2014/0157321 A1 | 6/2014 | Kurita |
| 2014/0181089 A1 | 6/2014 | Desmond |
| 2014/0189584 A1 | 7/2014 | Weng |
| 2014/0198234 A1 | 7/2014 | Kobayashi |
| 2014/0218371 A1 | 8/2014 | Du |
| 2014/0222809 A1 | 8/2014 | Hochmuth |
| 2014/0236882 A1 | 8/2014 | Rishe |
| 2014/0250126 A1 | 9/2014 | Baldwin |
| 2014/0250374 A1 | 9/2014 | Ohki |
| 2014/0282011 A1 | 9/2014 | Dellinger |
| 2014/0289222 A1 | 9/2014 | Sharpe |
| 2014/0337324 A1 | 11/2014 | Chao |
| 2014/0341476 A1* | 11/2014 | Kulick ................ G06K 9/6267 382/224 |
| 2014/0351720 A1 | 11/2014 | Yin |
| 2015/0005013 A1 | 1/2015 | Cao |
| 2015/0078680 A1 | 3/2015 | Shakib |
| 2015/0082250 A1 | 3/2015 | Wagner |
| 2015/0091896 A1 | 4/2015 | Tarquini |
| 2015/0106752 A1 | 4/2015 | Yang |
| 2015/0130719 A1 | 5/2015 | Wehrenberg |
| 2015/0143234 A1 | 5/2015 | Norris, III |
| 2015/0213604 A1 | 7/2015 | Li |
| 2015/0227611 A1 | 8/2015 | Bao |
| 2015/0287162 A1 | 10/2015 | Canan |
| 2015/0363409 A1* | 12/2015 | Wood ................ G06F 17/30058 707/738 |
| 2016/0019388 A1* | 1/2016 | Singla .................. G06F 21/552 726/23 |
| 2016/0140146 A1 | 5/2016 | Wexler |
| 2016/0358311 A1 | 12/2016 | Chen |
| 2017/0019587 A1 | 1/2017 | Matas |
| 2017/0244959 A1 | 8/2017 | Ranjeet |
| 2017/0357409 A1 | 12/2017 | Wagner |
| 2018/0091732 A1 | 3/2018 | Wilson |

FOREIGN PATENT DOCUMENTS

| | | |
|---|---|---|
| CN | 1756273 A | 4/2006 |
| CN | 101196786 A | 6/2008 |
| CN | 101291409 A | 10/2008 |
| EP | 1124175 A2 | 8/2001 |
| EP | 1289210 A2 | 3/2003 |
| FR | 2830093 A3 | 3/2003 |
| GB | 2420260 A | 5/2006 |
| JP | H03217976 A | 9/1991 |
| JP | H06309138 A | 11/1994 |
| JP | H08106469 A | 4/1996 |
| JP | H11164175 A | 6/1999 |
| JP | H11168694 A | 6/1999 |
| JP | 2000112997 A | 4/2000 |
| JP | 2000138883 A | 5/2000 |
| JP | 2000148591 A | 5/2000 |
| JP | 2000163031 A | 6/2000 |
| JP | 2000221879 A | 8/2000 |
| JP | 2000244673 A | 9/2000 |
| JP | 2000350134 A | 12/2000 |
| JP | 2001136303 A | 5/2001 |
| JP | 2001265481 A | 9/2001 |
| JP | 2001309019 A | 11/2001 |
| JP | 2003338975 A | 11/2003 |
| JP | 2003345491 A | 12/2003 |
| JP | 2004032346 A | 1/2004 |
| JP | 2004145291 A | 5/2004 |
| JP | 2004153832 A | 5/2004 |
| JP | 2004288208 A | 10/2004 |
| JP | 2004336536 A | 11/2004 |
| JP | 2004336711 A | 11/2004 |
| JP | 2005038101 A | 2/2005 |
| JP | 2005092386 A | 4/2005 |
| JP | 2005100084 A | 4/2005 |
| JP | 2005515530 A | 5/2005 |
| JP | 2005150836 A | 6/2005 |
| JP | 2005175991 A | 6/2005 |
| JP | 2005182320 A | 7/2005 |
| JP | 2005202483 A | 7/2005 |
| JP | 2005202651 A | 7/2005 |
| JP | 2005303728 A | 10/2005 |
| JP | 2005321516 A | 11/2005 |
| JP | 2005339420 A | 12/2005 |
| JP | 2006067344 A | 3/2006 |
| JP | 2006139340 A | 6/2006 |
| JP | 2006140865 A | 6/2006 |
| JP | 2006195592 A | 7/2006 |
| JP | 2006236249 A | 9/2006 |
| JP | 2007515775 A | 6/2007 |
| JP | 2007525775 A | 9/2007 |
| JP | 2008059614 A | 3/2008 |
| JP | 2008106469 A | 5/2008 |
| JP | 2008518330 A | 5/2008 |
| JP | 2008236794 A | 10/2008 |
| JP | 2010118056 A | 5/2010 |
| JP | 2013140171 A | 7/2013 |
| JP | 5771242 B2 | 11/2013 |
| KR | 20050101162 A | 10/2005 |
| KR | 20060032793 A | 4/2006 |
| WO | 2003023593 A1 | 3/2003 |
| WO | 2003081458 A1 | 10/2003 |
| WO | 2005093550 A2 | 10/2005 |
| WO | 2005103863 A2 | 11/2005 |

(56) References Cited

FOREIGN PATENT DOCUMENTS

| WO | 2008030779 | A2 | 3/2008 |
|---|---|---|---|
| WO | 2009082814 | A1 | 7/2009 |
| WO | 2009150425 | | 12/2009 |
| WO | 2009155991 | A1 | 12/2009 |
| WO | 2010059188 | A2 | 5/2010 |

OTHER PUBLICATIONS

Cyr, Jim, "Apple Watch—Customize Modular Watch Face," May 13, 2015, Retrieved from the Internet: URL: https://www.youtube.com/watch?v=02W93HbKIK8 [Retrieved on Sep. 16, 2016], 2 pages.
Geek, "How to Put the Day of the Week into the Windows Taskbar Clock," 2014, Retrieved from the Internet: URL: https://www.howtogeek.com/194103/how-to-put-the-day-of-the-week-into-the-windows-taskbar-clock/ [Retrieved on Mar. 10, 2017], 3 pages.
Hinckley et al., "Sensing Techniques for Mobile Interaction," Symposium on User Interface Software and Technology, CHI Letters, vol. 2, No. 2, Nov. 2000, pp. 91-100.
International Search Report and Written Opinion received for PCT Patent Application No. PCT/US2017/035322, dated Oct. 5, 2017, 18 pages.
Invitation to Pay Additional Fees received for PCT Patent Application No. PCT/US2017/035322, dated Aug. 7, 2017, 4 pages.
Karlson et al., "AppLens and LaunchTile: Two Designs for One-Handed Thumb Use on Small Devices," CHI 2005, Papers: Small Devices 1, Apr. 2-7, 2005, pp. 201-210.
Liao, T. Warren, "Clustering of time series data—a survey," Pattern Recognition, Elsevier, GB, vol. 38, No. 11, Nov. 1, 2005 (Nov. 1, 2005), pp. 1857-1874, XP027610890, ISSN: 0031-3203 [retrieved on Nov. 1, 2005].
Marwan et al., "Generalised recurrence plot analysis for spatial data," Physics Letter, North-Holland Publishing Co., Amsterdam, NL, vol. 360, No. 4-5, Nov. 24, 2006 (Nov. 24, 2006), pp. 545-551, XP005779144, ISSN: 0375-9601, DOI: 10.1016/J.PHYSLETA.2006.08.058.
Mozilla Developer Network, "Mouse Gesture Events," May 14, 2009, Retrieved from the Internet: URL: https://developer.mozilla.org/en-US/docs/Web/Guide/Events/Mouse_gesture_events [Retrieved on May 17, 2011], 3 pages.
Office Action received for Danish Patent Application No. PA201670608, dated Jan. 23, 2018, 10 pages.
Office Action received for Danish Patent Application No. PA201670608, dated Jan. 3, 2017, 15 pages.
Office Action received for Danish Patent Application No. PA201670609, dated Feb. 1, 2017, 11 pages.
Office Action received for Danish Patent Application No. PA201670609, dated Jan. 26, 2018, 8 pages.
Office Action received for Danish Patent Application No. PA201670609, dated May 7, 2018, 4 pages.
van Wijk, Jarke J. et al., "Cluster and Calendar based Visualization of Time Series Data," Information Visualization, 1999, (INFO VIS '99), Proceedings, 1999 IEEE Symposium on San Francisco, CA, USA Oct. 24-29, 1999, Los Alamitos, CA, USA, IEEE Comput. Soc., US, Oct. 24, 1999 (Oct. 24, 1999), pp. 4-9, 140, XP010356933, DOI: 10.1109/INFVIS.1999.801851 ISBN: 978-0-7695-0431-5.
YouTube, Steve Jobs—Presenting the iPhone, Jan. 9, 2007, (iPhone Introduction in 2007), Retrieved from the Internet: URL: https://www.youtube.com/watch?v=9hUlxyE2Ns8 [Retrieved on Apr. 23, 2015], 3 pages.
Das et al, Event Classification in Personal Image Collections, IEEE Intl. Workshop on Media Information Analysis for Personal and Social Applications at ICME 2009.
Das et al, Event-based Location Matching for Consumer Image Collections, Proc. of the ACM Int. Conf. on Image and Video Retrieval, 2008.
Event Detection from Flickr Data through Wavelet-based Spatial Analysis, Ling Chen & Abhishek Roy, Proceeding of the 18th ACM Conference on Information and Knowledge Management, CIKM 2009, Jan. 1, 2009, p. 523-532.
Gallagher et al, Image Annotation Using Personal Calendars as Context, ACM Intl. Conf. on Multimedia 2008.
Han et al, Data Mining Concepts and Techniques, Elsevier 2006, p. 418-420.
International Search Report and Written Opinion received in corresponding PCT Application No. PCT/US2011/048169, dated Oct. 21, 2011.

* cited by examiner

KNOWLEDGE GRAPH METADATA NETWORK BASED ON NOTABLE MOMENTS

CROSS-REFERENCE TO RELATED APPLICATIONS

This application claims priority to the following applications: (i) U.S. Provisional Patent Application No. 62/349,109, entitled "USER INTERFACES FOR RETRIEVING CONTEXTUALLY RELEVANT MEDIA CONTENT," filed Jun. 12, 2016; (ii) U.S. Provisional Patent Application No. 62/349,092, entitled "NOTABLE MOMENTS IN A COLLECTION OF DIGITAL ASSETS," filed Jun. 12, 2016; (iii) U.S. Provisional Patent Application No. 62/349,094, entitled "KNOWLEDGE GRAPH METADATA NETWORK BASED ON NOTABLE MOMENTS," filed Jun. 12, 2016; and (iv) U.S. Provisional Patent Application No. 62/349,099, entitled "RELATING DIGITAL ASSETS USING NOTABLE MOMENTS," filed Jun. 12, 2016. Each of the above-referenced applications is incorporated by reference in its entirety.

This application is related to the following applications: (i) U.S. Non-Provisional patent application Ser. No. 15/391,269, entitled "NOTABLE MOMENTS IN A COLLECTION OF DIGITAL ASSETS," filed Dec. 27, 2016; (ii) U.S. Non-Provisional patent application Ser. No. 15/391,280, entitled "RELATING DIGITAL ASSETS USING NOTABLE MOMENTS," filed Dec. 27, 2016; and (iii) U.S. Non-provisional patent application Ser. No. 15/275,294, entitled "USER INTERFACES FOR RETRIEVING CONTEXTUALLY RELEVANT MEDIA CONTENT," filed Sep. 23, 2016. Each of these related applications is incorporated by reference in its entirety.

FIELD

Embodiments described herein relate to digital asset management (also referred to as DAM). More particularly, embodiments described herein relate to generating a knowledge graph metadata network (also referred to as a metadata network) based on one or more notable moments in a collection of the digital assets (also referred to as a DA collection) that can assist with managing the DA collection.

BACKGROUND

Modern consumer electronics have enabled users to create, purchase, and amass considerable digital assets (also referred to as DAs). For example, a computing system (e.g., a smartphone, a stationary computer system, a portable computer system, a media player, a tablet computer system, a wearable computer system or device, etc.) can store or have access to a collection of digital assets (also referred to as a DA collection) that includes hundreds or thousands of DAs (e.g., images, videos, music, etc.).

Managing a DA collection can be a resource-intensive exercise for users. For example, retrieving multiple DAs representing a sentimental moment in a user's life from a sizable DA collection can require the user to sift through many irrelevant DAs. This process can be arduous and unpleasant for many users. A digital asset management (DAM) system can assist with managing a DA collection. A DAM system represents an intertwined system incorporating software, hardware, and/or other services in order to manage, store, ingest, organize, and retrieve DAs in a DA collection. An important building block for at least one commonly available DAM system is a database. Databases are commonly known as data collections that are organized as schemas, tables, queries, reports, views, and other objects. Exemplary databases include relational databases (e.g., tabular databases, etc.), distributed databases that can be dispersed or replicated among different points in a network, and object-oriented programming databases that can be congruent with the data defined in object classes and subclasses.

One problem associated with using databases for digital asset management (DAM) is that the DAM system can become resource-intensive. That is, substantial computational resources may be needed to manage the DAs in the DA collection (e.g., processing power for performing queries or transactions, storage memory space for storing the necessary databases, etc.). This requirement may assist with reducing the processing power available for other tasks. Another related problem associated with using databases is that digital asset management (DAM) cannot be easily implemented on a computing system with limited storage capacity without managing the assets directly (e.g., a portable device such as a smartphone or a wearable device). Consequently, a DAM system's functionality is generally provided by a remote device (e.g., an external data store, an external server, etc.) where copies of the DAs are stored and the results are transmitted back to the computing system having limited storage capacity. Requiring external data stores and/or servers in order to use databases for managing a large DA collection can assist with making digital asset management (DAM) resource-intensive. This requirement may also assist with reducing the processing power available for other tasks on the local device. At least one currently available DAM system uses metadata associated with a DA collection—such as spatiotemporal metadata (e.g., time metadata, location metadata, etc.)—to organize DAs in the DA collection into multiple events. These currently available DAM system(s), however, organize the metadata associated with the DA collection using databases, which can contribute to making digital asset management (DAM) a resource-intensive endeavor as explained above.

SUMMARY

Methods, apparatuses, and systems for generating a knowledge graph metadata network (also referred to as a metadata network) based on a collection of the digital assets (DA collection) are described. Such embodiments can enable digital asset management (DAM) of digital assets (DAs) without using traditional databases.

For one embodiment, a DAM logic/module obtains or generates a knowledge graph metadata network (metadata network) associated with a collection of digital assets (DA collection). The metadata network can comprise correlated metadata assets describing characteristics associated with digital assets (DAs) in the DA collection. Each metadata asset can describe a characteristic associated with one or more digital assets (DAs) in the DA collection. For a non-limiting example, a metadata asset can describe a characteristic associated with multiple DAs in the DA collection. Each metadata asset can be represented as a node in the metadata network. A metadata asset can be correlated with at least one other metadata asset. Each correlation between metadata assets can be represented as an edge in the metadata network that is between the nodes representing the correlated metadata assets.

For one embodiment, the DAM logic/module identifies a first metadata asset in the metadata network. The DAM logic/module can also identify a second metadata asset based on at least the first metadata asset. For one embodiment, the DAM logic/module causes one or more DAs associated with the first and/or second metadata assets to be presented via an output device.

Other features or advantages attributable to the embodiments described herein will be apparent from the accompanying drawings and from the detailed description that follows below.

BRIEF DESCRIPTION OF THE DRAWINGS

Embodiments described herein are illustrated by examples and not limitations in the accompanying drawings, in which like references indicate similar features. Furthermore, in the drawings some conventional details have been omitted so as not to obscure the inventive concepts described herein.

FIGS. 3B-3C provides additional details about the operation illustrated in FIG. 3A.

FIG. 3D provides additional details about the operation illustrated in FIGS. 3B-3C.

DETAILED DESCRIPTION

Methods, apparatuses, and systems for generating a knowledge graph metadata network (also referred to as a metadata network) based on a collection of digital assets (also referred to as a DA collection) are described. Such embodiments can enable digital asset management (DAM) for digital assets (also referred to as DAs) in the DA collection without using traditional databases.

Embodiments set forth herein can assist with improving computer functionality by enabling computing systems that use one or more embodiments of the metadata network described herein for digital asset management (DAM). Such computing systems can implement DAM to assist with reducing or eliminating the need to use databases for digital asset management (DAM). This reduction or elimination can, in turn, assist with minimizing wasted computational resources (e.g., memory, processing power, computational time, etc.) that may be associated with using databases for DAM. For example, DAM via databases may include external data stores and/or remote servers (as well as networks, communication protocols, and other components required for communicating with external data stores and/or remote servers). In contrast, DAM performed as described herein can occur locally on a device (e.g., a portable computing system, a wearable computing system, etc.) without the need for external data stores, remote servers, networks, communication protocols, and/or other components required for communicating with external data stores and/or remote servers. Consequently, at least one embodiment of DAM described herein can assist with reducing or eliminating the additional computational resources (e.g., memory, processing power, computational time, etc.) that may be associated with using databases for DAM.

Figure 1A:
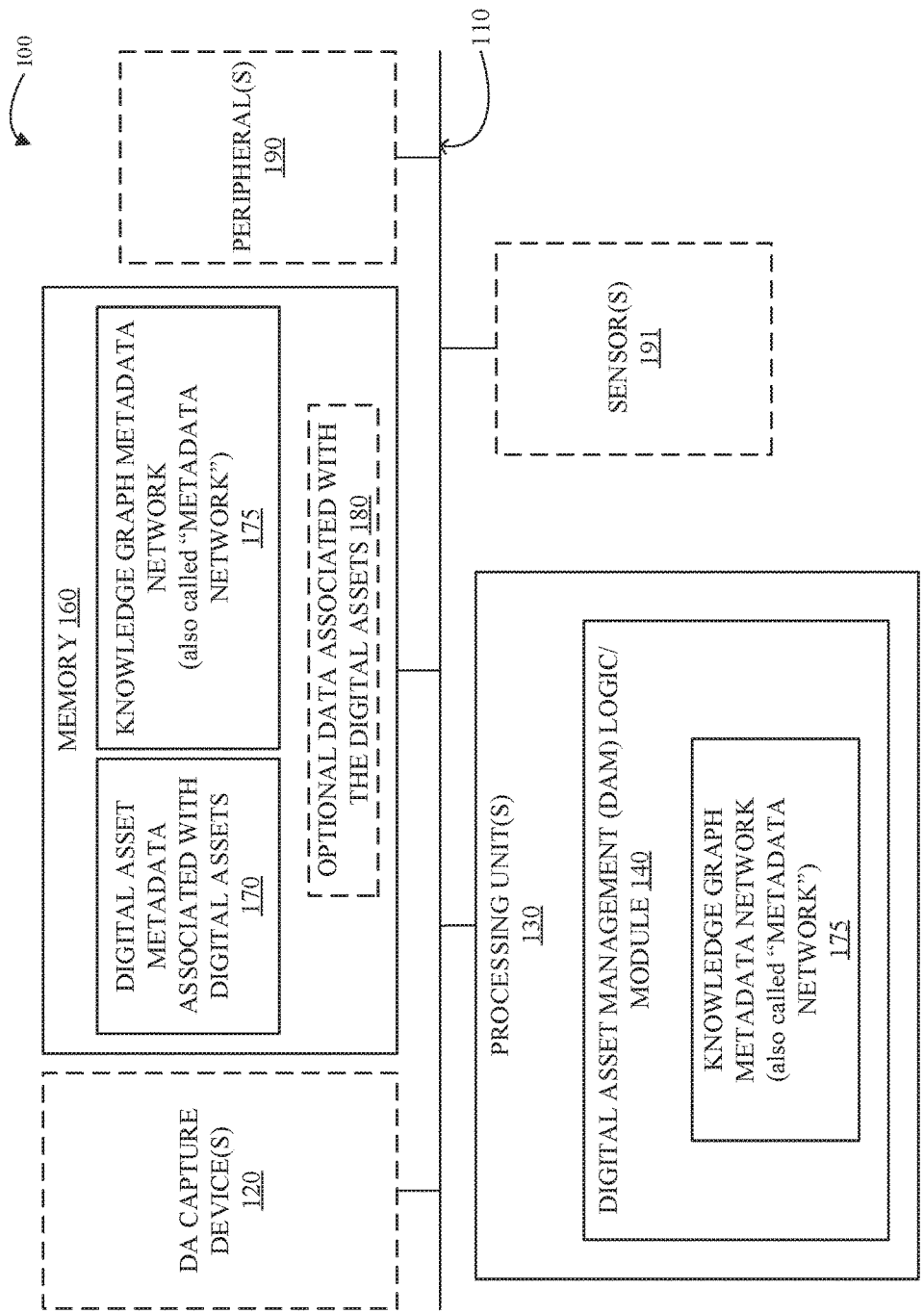
FIG. 1A illustrates, in block diagram form, an asset management processing system that includes electronic components for performing digital asset management (DAM) in accordance with an embodiment.

FIG. 1A illustrates, in block diagram form, a processing system 100 that includes electronic components for performing digital asset management (DAM) in accordance with this disclosure. The system 100 can be housed in single computing system, such as a desktop computer system, a laptop computer system, a tablet computer system, a server computer system, a mobile phone, a media player, a personal digital assistant (PDA), a personal communicator, a gaming device, a network router or hub, a wireless access point (AP) or repeater, a set-top box, or a combination thereof. Components in the system 100 can be spatially separated and implemented on separate computing systems that are connected by the communication technology 110, as described in further detail below.

For one embodiment, the system 100 may include processing unit(s) 130, memory 160, a DA capture device 120, sensor(s) 191, and peripheral(s) 190. For one embodiment, one or more components in the system 100 may be implemented as one or more integrated circuits (ICs). For example, at least one of the processing unit(s) 130, the communication technology 110, the DA capture device 120, the peripheral(s) 190, the sensor(s) 191, or the memory 160 can be implemented as a system-on-a-chip (SoC) IC, a three-dimensional (3D) IC, any other known IC, or any known IC combination. For another embodiment, two or more components in the system 100 are implemented together as one or more ICs. For example, at least two of the processing unit(s) 130, the communication technology 110, the DA capture device 120, the peripheral(s) 190, the sensor(s) 191, or the memory 160 are implemented together as an SoC IC. Each component of system 100 is described below.

As shown in FIG. 1A, the system 100 can include processing unit(s) 130, such as CPUs, GPUs, other integrated circuits (ICs), memory, and/or other electronic circuitry. For one embodiment, the processing unit(s) 130 manipulate and/or process metadata 170 or optional data 180 associated with digital assets (e.g., manipulate computer graphics, perform image processing, manipulate audio files, any other known processing operations performed on DAs, etc.). The processing unit(s) 130 may include a digital asset management (DAM) module/logic 140 for performing one or more embodiments of DAM, as described herein. For one embodiment, the DAM module/logic 140 is implemented as hardware (e.g., electronic circuitry associated with the processing unit(s) 130, circuitry, dedicated logic, etc.), software (e.g., one or more instructions associated with a computer program executed by the processing unit(s) 130, software run on a general-purpose computer system or a dedicated machine, etc.), or a combination thereof.

Figure 1B:
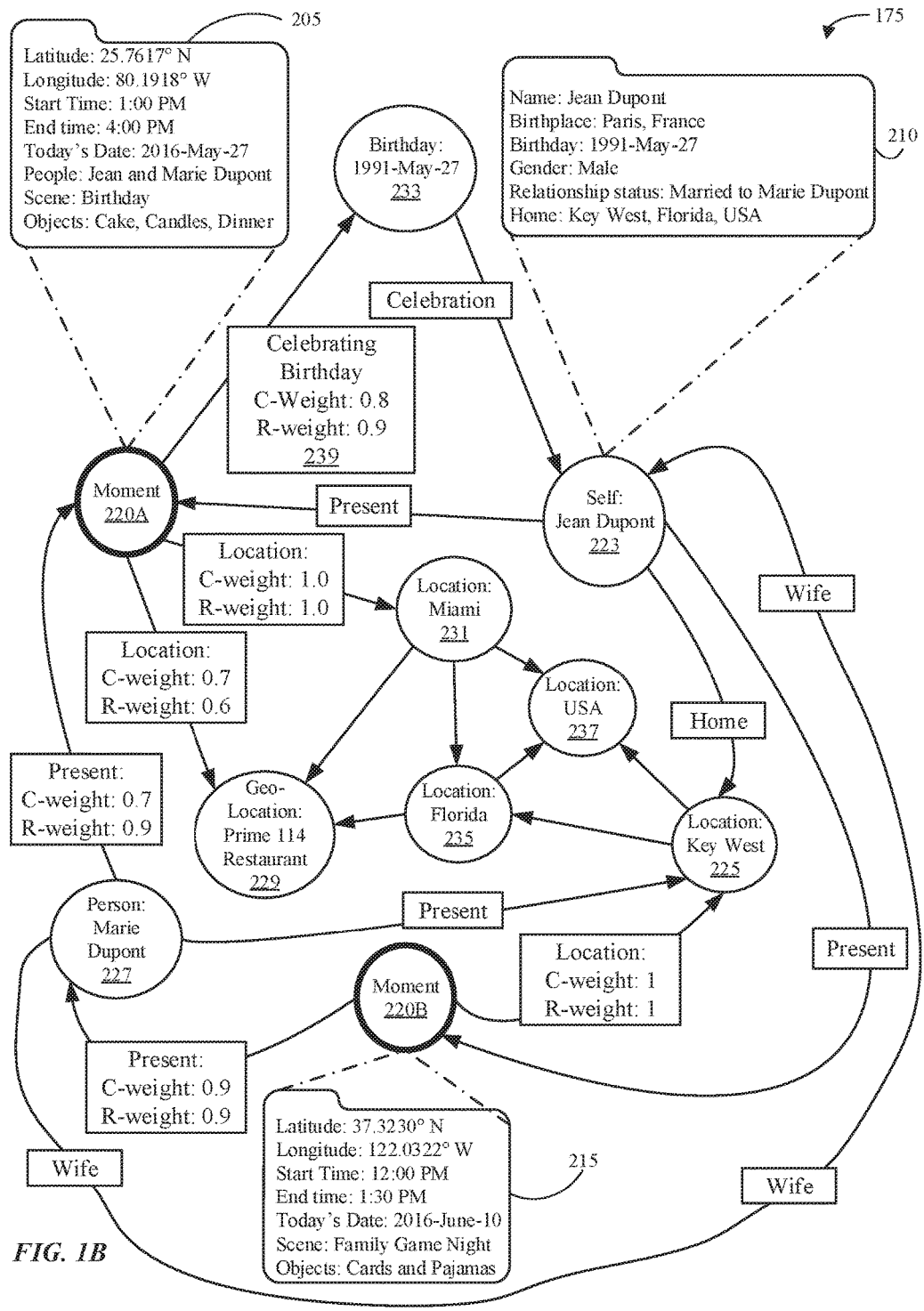
FIG. 1B illustrates, in block diagram form, an exemplary knowledge graph metadata network (also referred to as a metadata network) in accordance with one embodiment. The exemplary metadata network illustrated in FIG. 1B can be generated and/or used by the DAM processing system illustrated in FIG. 1A in accordance with an embodiment.

The DAM module/logic 140 can enable the system 100 to generate and use a knowledge graph metadata network (metadata network) 175 of the DA metadata 170 as a multidimensional network. Metadata networks and multidimensional networks are described below. FIG. 1B (which is described below) provides additional details about generating the metadata network 175. For one embodiment, the DAM module/logic 140 can perform one or more of the following: (i) generate the metadata network 175; (ii) relate and/or present at least two DAs based on the metadata network 175; (iii) determine and/or present interesting DAs in the DA collection based on the metadata network 175 and predetermined criterion; and (iv) select and/or present representative DAs to summarize a moment's DAs based on input specifying the representative group's size. Additional details about the immediately preceding operations performed by the DAM logic/module 140 are described below in connection with FIGS. 1B-6.

The DAM module/logic 140 can obtain or receive a collection of DA metadata 170 associated with a DA collection. As used herein, a "digital asset," a "DA," and their variations refer to data that can be stored in or as a digital form (e.g., a digital file etc.). This digitalized data includes, but is not limited to, the following: image media (e.g., a still or animated image, etc.); audio media (e.g., a song, etc.); text media (e.g., an E-book, etc.); video media (e.g., a movie, etc.); and haptic media (e.g., vibrations or motions provided in connection with other media, etc.). The examples of digitalized data above can be combined to form multimedia (e.g., a computer animated cartoon, a video game, etc.). A single DA refers to a single instance of digitalized data (e.g., an image, a song, a movie, etc.). Multiple DAs or a group of DAs refers to multiple instances of digitalized data (e.g., multiple images, multiple songs, multiple movies, etc.). Throughout this disclosure, the use of "a DA" refers to "one or more DAs" including a single DA and a group of DAs. For brevity, the concepts set forth in this document use an operative example of a DA as one or more images. It is to be appreciated that a DA is not so limited and the concepts set forth in this document are applicable to other DAs (e.g., the different media described above, etc.).

As used herein, a "digital asset collection," a "DA collection," and their variations refer to multiple DAs that may be stored in one or more storage locations. The one or more storage locations may be spatially or logically separated as is known.

As used herein, "metadata," "digital asset metadata," "DA metadata," and their variations collectively refer to information about one or more DAs. Metadata can be: (i) a single instance of information about digitalized data (e.g., a time stamp associated with one or more images, etc.); or (ii) a grouping of metadata, which refers to a group comprised of multiple instances of information about digitalized data (e.g., several time stamps associated with one or more images, etc.). There are different types of metadata. Each type of metadata (also referred to as "metadata type") describes one or more characteristics or attributes associated with one or more DAs. Each metadata type can be categorized as primitive metadata or inferred metadata, as described in further detail below.

For one embodiment, the DAM module/logic 140 can identify primitive metadata associated with one or more DAs within the DA metadata 170. For a further embodiment, the DAM module/logic 140 may determine inferred metadata based at least on the primitive metadata.

As used herein, "primitive metadata" refers to metadata that describes one or more characteristics or attributes associated with one or more DAs. That is, primitive metadata includes acquired metadata describing one or more DAs. In some scenarios, primitive metadata can be extracted from inferred metadata, as described in further detail below. In accordance with this disclosure, there are two categories of primitive metadata—(i) primary primitive metadata; and (ii) auxiliary primitive metadata.

Primary primitive metadata can include one or more of: time metadata; geo-position metadata; geolocation metadata; people metadata; scene metadata; content metadata; object metadata; and sound metadata. Time metadata refers to a time associated with one or more DAs (e.g., a timestamp associated with a DA, a time the DA is generated, a time the DA is modified, a time the DA is stored, a time the DA is transmitted, a time the DA is received, etc.). Geo-position metadata refers to geographic or spatial attributes associated with one or more DAs using a geographic coordinate system (e.g., latitude, longitude, and/or altitude, etc.). Geolocation metadata refers to one or more meaningful locations associated with one or more DAs rather than geographic coordinates associated with the DA(s). Examples include a beach (and its name) a street address, a country name, a region, a building, a landmark, etc. Geolocation metadata can, for example, be determined by processing geo-position information together with data from a map application to determine that the geolocation for a scene in a group of images. People metadata refers to at least one detected or known person associated with one or more DAs (e.g., a known person in an image detected through facial recognition techniques, etc.). Scene metadata refers to an overall description of an activity or situation associated with one or more DAs. For example, if a DA includes a group of images, then scene metadata for the group of images can be determined using detected objects in images. For a more specific example, the presence of a large cake with candles and balloons in at least two images in the group can be used to determine that the scene for the group of images is a birthday celebration. Object metadata refers to one or more detected objects associated with one or more DAs (e.g., a detected animal, a detected company logo, a detected piece of furniture, etc.). Content metadata refers to the features of a DA (e.g., pixel characteristics, pixel intensity values, luminance values, brightness values, loudness levels, etc., etc.). Sound metadata refers to one or more detected sounds associated with one or more DAs (e.g., a detected sound is a human's voice, a detected sound is a fire truck's siren, etc.).

Auxiliary primitive metadata includes, but is not limited to, the following: (i) a condition associated with capturing one or more DAs; (ii) a condition associated with modifying one or more DAs; and (iii) a condition associated with storing or retrieving one or more DAs. Examples of a condition associated with capturing a DA include, but are not limited to, an image sensor or other electronic component used to generate a DA. Examples of a condition associated with modifying a DA include, but are not limited to an algorithm or operation performed on a DA to convert it from one format to another, and an algorithm or operation performed on a DA to edit the DA's characteristics. Examples of a condition associated with storing or retrieving a DA include, but are not limited to, a memory cell's logical address, a storage element's logical address, a network host at which the DA resides, and a physical address represented as a binary number on the address bus circuitry in order to enable a data bus to access a particular storage cell or a register in a memory mapped I/O device.

For an illustrative example, primitive metadata associated with a DA (e.g., one or more images, etc.) can include the following: a capture time associated with the one or more images; a modification time associated with the one or more images; a storage time associated with the one or more images; a storage location associated with the one or more images; an image processing operation performed on the one or more images; pixel values describing pixel intensities in the one or more images; a category/name of an imaging sensor used to capture the one or more images; and a geographic or spatial location (e.g., latitude, longitude, altitude, etc.) associated with capture, modification, storage, or processing of the one or more images as obtained from a global positioning system (GPS) or other known tracking device.

As used herein, "inferred metadata" refers to additional information about one or more DAs that is beyond the information provided by primitive metadata. One difference between primitive metadata and inferred metadata is that primitive metadata represents an initial set of descriptions of one or more DA while inferred metadata provides additional descriptions of the one or more DAs based on processing one or more of the primitive metadata (i.e., the initial set of descriptions) and contextual information. For example, primitive metadata may identify two detected persons in a group of images as John Doe and Jane Doe, while inferred metadata may identify John Doe and Jane Doe as a married couple based on processing one or more of the primitive metadata (i.e., the initial set of descriptions) and contextual information. For one embodiment, inferred metadata is formed from at least one of: (i) a combination of different types of primitive metadata; (ii) a combination of different types of contextual information; or (iii) a combination of primitive metadata and contextual information.

As used herein, "context" and its variations refer to any or all attributes of a user's device that includes or has access to a DA collection associated with the user, such as physical, logical, social, and other contextual information. As used herein, "contextual information" and its variations refer to metadata that describes or defines a user's context or a context of a user's device that includes or has access to a DA collection associated with the user. Exemplary contextual information includes, but is not limited to, the following: a predetermined time interval; an event scheduled to occur in a predetermined time interval; a geolocation to be visited in a predetermined time interval; one or more identified persons associated with a predetermined time; an event scheduled for a predetermined time, or a geolocation to be visited at predetermined time; weather metadata describing weather associated with a particular period in time (e.g., rain, snow, sun, temperature, etc.); season metadata describing a season associated with capture of the image. For some embodiments, the contextual information can be obtained from external sources, a social networking application, a weather application, a calendar application, an address book application, any other type of application, or from any type of data store accessible via a wired or wireless network (e.g., the Internet, a private intranet, etc.).

Two categories of inferred metadata are set forth herein—(i) primary inferred metadata; and (ii) auxiliary inferred metadata. Primary inferred metadata can include event metadata describing one or more events associated with one or more DAs. For example, if a DA includes one or more images, the primary inferred metadata can include event metadata describing one or more events where the one or more images were captured (e.g., a vacation, a birthday, a sporting event, a concert, a graduation ceremony, a dinner, a project, a work-out session, a traditional holiday, etc.). Primary inferred metadata can, in some embodiments, be determined by clustering one or more of primary primitive metadata, auxiliary primitive metadata, and contextual metadata.

Auxiliary inferred metadata includes, but is not limited to, the following: (i) geolocation relationship metadata; (iii) person relationship metadata; (iii) object relationship metadata; and (iv) sound relationship metadata. Geolocation relationship metadata refers to a relationship between one or more known persons associated with one or more DAs and one or more meaningful locations associated with the one or more DAs. For example, an analytics engine or data mining technique can be used to determine that a scene associated with one or more images of John Doe represents John Doe's home. Person relationship metadata refers to a relationship between one or more known persons associated with one or more DAs and one or more other known persons associated with the one or more DAs. For example, an analytics engine or data mining technique can be used to determine that Jane Doe (who appears in one or more images with John Doe) is John Doe's wife. Object relationship metadata refers to a relationship between one or more known objects associated with one or more DAs and one or more known persons associated with the one or more DAs. For example, an analytics engine or data mining technique can be used to determine that a boat appearing in one or more images with John Doe is owned by John Doe. Sound relationship metadata refers to a relationship between one or more known sounds associated with one or more DAs and one or more known persons associated with the one or more DAs. For example, an analytics engine or data mining technique can be used to determine that a voice that appears in one or more videos with John Doe is John Doe's voice.

As explained above, inferred metadata may be determined or inferred from primitive metadata and/or contextual information by performing at least one of the following: (i) data mining the primitive metadata and/or contextual information; (ii) analyzing the primitive metadata and/or contextual information; (iii) applying logical rules to the primitive metadata and/or contextual information; or (iv) any other known methods used to infer new information from provided or acquired information. Also, primitive metadata can be extracted from inferred metadata. For a specific embodiment, primary primitive metadata (e.g., time metadata, geolocation metadata, scene metadata, etc.) can be extracted from primary inferred metadata (e.g., event metadata, etc.). Techniques for determining inferred metadata and/or extracting primitive metadata from inferred metadata can be iterative. For a first example, inferring metadata can trigger the inference of other metadata and so on. For a second example, extracting primitive metadata from inferred metadata can trigger inference of additional inferred metadata or extraction of additional primitive metadata.

Referring again to FIG. 1A, the primitive metadata and the inferred metadata described above are collectively referred to as the DA metadata 170. For one embodiment, the DAM module/logic 140 uses the DA metadata 170 to generate a metadata network 175. As shown in FIG. 1A, all or some of the metadata network 175 can be stored in the processing unit(s) 130 and/or the memory 160. As used herein, a "knowledge graph," a "knowledge graph metadata network," a "metadata network," and their variations refer to a dynamically organized collection of metadata describing one or more DAs (e.g., one or more groups of DAs in a DA collection, one or more DAs in a DA collection, etc.) used by one or more computer systems for deductive reasoning. In a metadata network, there is no DA—only metadata (e.g., metadata associated with one or more groups of DAs, metadata associated with one or more DAs, etc.). Metadata networks differ from databases because, in general, a metadata network enables deep connections between metadata using multiple dimensions, which can be traversed for additionally deduced correlations. This deductive reasoning generally is not feasible in a conventional relational database without loading a significant number of database tables (e.g., hundreds, thousands, etc.). As such, conventional databases may require a large amount of computational resources (e.g., external data stores, remote servers, and their associated communication technologies, etc.) to perform deductive reasoning. In contrast, a metadata network may be viewed, operated, and/or stored using fewer computational resource requirements than the preceding example of databases. Furthermore, metadata networks are dynamic resources that have the capacity to learn, grow, and adapt as new information is added to them. This is unlike databases, which are useful for accessing cross-referred information. While a database can be expanded with additional information, the database remains an instrument for accessing the cross-referred information that was put into it. Metadata networks do more than access cross-referred information—they go beyond that and involve the extrapolation of data for inferring or determining additional data.

As explained in the preceding paragraph, a metadata network enables deep connections between metadata using multiple dimensions in the metadata network, which can be traversed for additionally deduced correlations. Each dimension in the metadata network may be viewed as a grouping of metadata based on metadata type. For example, a grouping of metadata could be all time metadata assets in a metadata collection and another grouping could be all geo-position metadata assets in the same metadata collection. Thus, for this example, a time dimension refers to all time metadata assets in the metadata collection and a geo-position dimension refers to all geo-position metadata assets in the same metadata collection. Furthermore, the number of dimensions can vary based on constraints. Constraints include, but are not limited to, a desired use for the metadata network, a desired level of detail, and/or the available metadata or computational resources used to implement the metadata network. For example, the metadata network can include only a time dimension, the metadata network can include all types of primitive metadata dimensions, etc. With regard to the desired level of detail, each dimension can be further refined based on specificity of the metadata. That is, each dimension in the metadata network is a grouping of metadata based on metadata type and the granularity of information described by the metadata. For a first example, there can be two time dimensions in the metadata network, where a first time dimension includes all time metadata assets classified by week and the second time dimension includes all time metadata assets classified by month. For a second example, there can be two geolocation dimensions in the metadata network, where a first geolocation dimension includes all geolocation metadata assets classified by type of establishment (e.g., home, business, etc.) and the second geolocation dimension includes all geolocation metadata assets classified by country. The preceding examples are merely illustrative and not restrictive. It is to be appreciated that the level of detail for dimensions can vary depending on designer choice, application, available metadata, and/or available computational resources.

The DAM module/logic 140 may generate the metadata network 175 as a multidimensional network of the DA metadata 170. As used herein, a "multidimensional network" and its variations refer to a complex graph having multiple kinds of relationships. A multidimensional network generally includes multiple nodes and edges. For one embodiment, the nodes represent metadata, and the edges represent relationships or correlations between the metadata. Exemplary multidimensional networks include, but are not limited to, edge-labeled multigraphs, multipartite edge-labeled multigraphs, and multilayer networks.

For one embodiment, the nodes in the metadata network 175 represent metadata assets found in the DA metadata 170. For example, each node represents a metadata asset associated with one or more DAs in a DA collection. For another example, each node represents a metadata asset associated with a group of DAs in a DA collection. As used herein, a "metadata asset" and its variations refer to metadata (e.g., a single instance of metadata, a group of multiple instances of metadata, etc.) describing one or more characteristics of one or more DAs in a DA collection. As such, there can be a primitive metadata asset, an inferred metadata asset, a primary primitive metadata asset, an auxiliary primitive metadata asset, a primary inferred metadata asset, and/or an auxiliary inferred metadata asset. For a first example, a primitive metadata asset refers to a time metadata asset describing a time interval between Jun. 1, 2016 and Jun. 3, 2016 when one or more DAs were captured. For a second example, a primitive metadata asset refers to a geo-position metadata asset describing one or more latitudes and/or longitudes where one or more DAs were captured. For a third example, an inferred metadata asset refers to an event metadata asset describing a vacation in Paris, France between Jun. 5, 2016 and Jun. 30, 2016 when one or more DAs were captured.

For one embodiment, the metadata network 175 includes two types of nodes—(i) moment nodes; and (ii) non-moments nodes. As used herein, a "moment" refers a single event (as described by an event metadata asset) that is associated with one or more DAs. For example, a moment refers to a vacation in Paris, France that lasted between Jun. 1, 2016 and Jun. 9, 2016. For this example, the moment can be used to identify one or more DAs (e.g., one image, a group of images, a video, a group of videos, a song, a group of songs, etc.) associated with the vacation in Paris, France that lasted between Jun. 1, 2016 and Jun. 9, 2016 (and not with any other event).

As used herein, a "moment node" refers to a node in a multidimensional network that represents a moment (which is described above). Thus, a moment node refers to a primary inferred metadata asset representing a single event associated with one or more DAs. Primary inferred metadata is described above. As used herein, a "non-moment node" refers a node in a multidimensional network that does not represent a moment. Thus, a non-moment node refers to at least one of the following: (i) a primitive metadata asset associated with one or more DAs; or (ii) an inferred metadata asset associated with one or more DAs that is not a moment (i.e., not an event metadata asset).

As used herein, an "event" and its variations refer to a situation or an activity occurring at one or more locations during a specific time interval. An event includes, but is not limited to the following: a gathering of one or more persons to perform an activity (e.g., a holiday, a vacation, a birthday, a dinner, a project, a work-out session, etc.); a sporting event (e.g., an athletic competition, etc.); a ceremony (e.g., a ritual of cultural significance that is performed on a special occasion, etc.); a meeting (e.g., a gathering of individuals engaged in some common interest, etc.); a festival (e.g., a gathering to celebrate some aspect in a community, etc.); a concert (e.g., an artistic performance, etc.); a media event (e.g., an event created for publicity, etc.); and a party (e.g., a large social or recreational gathering, etc.).

For one embodiment, the edges in the metadata network 175 between nodes represent relationships or correlations between the nodes. For one embodiment, the DAM module/logic 140 updates the metadata network 175 as the DAM module/logic 140 obtains or receives new primitive metadata 170 and/or determines new inferred metadata 170 based on the new primitive metadata 170.

The DAM module/logic 140 can manage DAs associated with the DA metadata 170 using the metadata network 175. For a first example, DAM module/logic 140 can use the metadata network 175 to relate multiple DAs based on the correlations (i.e., the edges in the metadata network 175) between the DA metadata 170 (i.e., the nodes in the metadata network 175). For this first example, the DAM module/logic 140 relates the a first group of one or more DAs with a second group of one or more DAs based on the metadata assets that are represented as moment nodes in the metadata network 175. For a second example, DAM module/logic 140 uses the metadata network 175 to locate and present interesting groups of one or more DAs in DA collection based on the correlations (i.e., the edges in the metadata network 175) between the DA metadata (i.e., the nodes in the metadata network 175) and predetermined criterion. For this second example, the DAM module/logic 140 selects the interesting DAs based on moment nodes in the metadata network 175. Furthermore, and for this second example, the predetermined criterion refers to contextual information (which is described above). The predetermined time interval can be a current time interval or a future time interval. For a third example, the DAM module/logic 140 uses the metadata network 175 to select and present a representative group of one or more DAs that summarize a moment's DAs based on the correlations (i.e., the edges in the metadata network 175) between the DA metadata (i.e., the nodes in the metadata network 175) and input specifying the representative group's size. For this third example, the DAM module/logic 140 selects the representative DAs based on an event metadata asset. The event metadata asset can, but is not required to, be a moment node in the metadata network 175 associated with one or more DAs.

The system 100 can also include memory 160 for storing and/or retrieving metadata 170, the metadata network 175, and/or optional data 180 described by or associated with the metadata 170. The metadata 170, the metadata network 175, and/or the optional data 180 can be generated, processed, and/or captured by the other components in the system 100. For example, the metadata 170, the metadata network 175, and/or the optional data 180 includes data generated by, captured by, processed by, or associated with one or more peripherals 190, the DA capture device 120, or the processing unit(s) 130, etc. The system 100 can also include a memory controller (not shown), which includes at least one electronic circuit that manages data flowing to and/or from the memory 160. The memory controller can be a separate processing unit or integrated in processing unit(s) 130.

The system 100 can include a DA capture device 120 (e.g., an imaging device for capturing images, an audio device for capturing sounds, a multimedia device for capturing audio and video, any other known DA capture device, etc.). Device 120 is illustrated with a dashed box to show that it is an optional component of the system 100. Nevertheless, the DA capture device 120 is not always an optional component of the system 100—some embodiments of the system 100 may require the DA capture device 120 (e.g., a camera, a smartphone with a camera, etc.). For one embodiment, the DA capture device 120 can also include a signal processing pipeline that is implemented as hardware, software, or a combination thereof. The signal processing pipeline can perform one or more operations on data received from one or more components in the device 120. The signal processing pipeline can also provide processed data to the memory 160, the peripheral(s) 190, and/or the processing unit(s) 130.

The system 100 can also include peripheral(s) 190. For one embodiment, the peripheral(s) 190 can include at least one of the following: (i) one or more input devices that interact with or send data to one or more components in the system 100 (e.g., mouse, keyboards, etc.); (ii) one or more output devices that provide output from one or more components in the system 100 (e.g., monitors, printers, display devices, etc.); or (iii) one or more storage devices that store data in addition to the memory 160. Peripheral(s) 190 is illustrated with a dashed box to show that it is an optional component of the system 100. Nevertheless, the peripheral(s) 190 is not always an optional component of the system 100—some embodiments of the system 100 may require the peripheral(s) 190 (e.g., a smartphone with media recording and playback capabilities, etc.). The peripheral(s) 190 may also refer to a single component or device that can be used both as an input and output device (e.g., a touch screen, etc.). The system 100 may include at least one peripheral control circuit (not shown) for the peripheral(s) 190. The peripheral control circuit can be a controller (e.g., a chip, an expansion card, or a stand-alone device, etc.) that interfaces with and is used to direct operation(s) performed by the peripheral(s) 190. The peripheral(s) controller can be a separate processing unit or integrated in processing unit(s) 130. The peripheral(s) 190 can also be referred to as input/output (I/O) devices 190 throughout this document.

The system 100 can also include one or more sensors 191, which are illustrated with a dashed box to show that the sensor can be optional components of the system 100. Nevertheless, the sensor(s) 191 are not always optional components of the system 100—some embodiments of the system 100 may require the sensor(s) 191 (e.g., a camera that includes an imaging sensor, etc.). For one embodiment, the sensor(s) 191 can detect a characteristic of one or more environs. Examples of a sensor include, but are not limited to, a light sensor, an imaging sensor, an accelerometer, a sound sensor, a barometric sensor, a proximity sensor, a vibration sensor, a gyroscopic sensor, a compass, a barometer, a heat sensor, a rotation sensor, a velocity sensor, and an inclinometer.

For one embodiment, the system 100 includes communication mechanism 110. The communication mechanism 110 can be a bus, a network, or a switch. When the technology 110 is a bus, the technology 110 is a communication system that transfers data between components in system 100, or between components in system 100 and other components associated with other systems (not shown). As a bus, the technology 110 includes all related hardware components (wire, optical fiber, etc.) and/or software, including communication protocols. For one embodiment, the technology 110 can include an internal bus and/or an external bus. Moreover, the technology 110 can include a control bus, an address bus, and/or a data bus for communications associated with the system 100. For one embodiment, the technology 110 can be a network or a switch. As a network, the technology 110 may be any network such as a local area network (LAN), a wide area network (WAN) such as the Internet, a fiber network, a storage network, or a combination thereof, wired or wireless. When the technology 110 is a network, the components in the system 100 do not have to be physically co-located. When the technology 110 is a switch (e.g., a "cross-bar" switch), separate components in system 100 may be linked directly over a network even though these components may not be physically located next to each other. For example, two or more of the processing unit(s) 130, the communication technology 110, the memory 160, the peripheral(s) 190, the sensor(s) 191, and the DA capture device 120 are in distinct physical locations from each other and are communicatively coupled via the communication technology 110, which is a network or a switch that directly links these components over a network.

FIG. 1B illustrates, in block diagram form, an exemplary metadata network 175 in accordance with one embodiment. The exemplary metadata network 175 illustrated in FIG. 1B can be generated and used by the processing system 100 illustrated in FIG. 1A to perform DAM in accordance with an embodiment. For one embodiment, the metadata network 175 illustrated in FIG. 1B is similar to or the same as the metadata network 175 described above in connection with FIG. 1A. It is to be appreciated that the metadata network 175 described in FIG. 1B is exemplary and that every node that can be generated by the DAM module/logic 140 is not shown. For example, even though every possible node is not illustrated in FIG. 1B, the DAM module/logic 140 can generate a node to represent each metadata asset illustrated in boxes 205-210 of FIG. 1B.

In the metadata network 175 illustrated in FIG. 1B, nodes representing metadata are illustrated as circles and edges representing correlations between the metadata are illustrated as labeled connections between circles. Furthermore, moment nodes are represented as circles with thickened boundaries while other non-moment nodes lack the thickened boundaries. In addition, the metadata assets shown in boxes 205, 210, and 215 can be represented as non-moment nodes in the metadata network 175.

Generating the metadata network 175, by the DAM module/logic 140, can include defining nodes based on the primitive metadata and/or the inferred metadata associated with one or more DAs in a DA collection. As the DAM module/logic 140 identifies more primitive metadata within the metadata associated with a DA collection and/or infers metadata from at least the primitive metadata, the DAM module/logic 140 can generate additional nodes to represent the primitive metadata and/or the inferred metadata. Furthermore, as the DAM module/logic 140 determines correlations between nodes, the DAM module/logic 140 can create edges between the nodes. Two generation processes can be used to create the metadata network 175. The first generation process is initiated using a metadata asset that does not describe a moment (e.g., primary primitive metadata asset, an auxiliary primitive metadata asset, an auxiliary inferred metadata asset etc.). The second generation process is initiated using a metadata asset that describes a moment (e.g., an event metadata). Each of these generation processes is described below.

For the first generation process, the DAM module/logic 140 can generate a non-moment node 223 to represent metadata associated with a user, a consumer, or an owner of a DA collection associated with the metadata network 175.

As illustrated in FIG. 1B, a user is identified as Jean Dupont. For one embodiment, the DAM module/logic 140 generates the non-moment node 223 to represent the metadata 210 provided by the user (e.g., Jean Dupont, etc.) via an input device. For example, the user can add at least some of the metadata 210 about herself or himself to the metadata network 175 via an input device. In this way, the DAM module/logic 140 can use the metadata 210 to correlate the user with other metadata acquired from a DA collection. For example, and as shown in FIG. 1B, the metadata 210 provided by the user Jean Dupont can include one or more of his name, his birthplace (which is Paris, France), his birthdate (which is May 27, 1991), his gender (which is male), his relationship status (which is married), his significant other or spouse (which is Marie Dupont), and his current residence (which is in Key West, Fla., USA).

Still with regard to the first generation process, at least some of the metadata 210 can be predicted based on processing performed by the DAM module/logic 140. The DAM module/logic 140 may predict metadata 210 based on an analysis of metadata accessed via an application or metadata in a data store (e.g., memory 160 of FIG. 1, etc.). For example, the DAM module/logic 140 may predict the metadata 210 based on analyzing information acquired by accessing the user's contacts (via a contacts application), activities (via a calendar application or an organization application), contextual information (via sensor(s) 191 and/or peripheral(s) 190), and/or social networking data (via a social networking application).

For one embodiment, the metadata 210 includes, but is not limited to, other metadata, such as the user's relationships with other others (e.g., family members, friends, co-workers, etc.), the user's workplaces (e.g., past workplaces, present workplaces, etc.), the user's interests (e.g., hobbies, DAs owned, DAs consumed, DAs used, etc.), places visited by the user (e.g., previous places visited by the user, places that will be visited by the user, etc.). For one embodiment, the metadata 210 can be used alone or in conjunction with other data to determine or infer at least one of the following: (i) vacations or trips taken by Jean Dupont (e.g., nodes 231, etc.); days of the week (e.g., weekends, holidays, etc.); locations associated with Jean Dupont (e.g., nodes 231, 233, 235, etc.); Jean Dupont's social group (e.g., his wife Marie Dupont represented in node 227, etc.); Jean Dupont's professional or other groups (e.g., groups based on his occupation, etc.); types of places visited by Jean Dupont (e.g., Prime 114 restaurant represented in node 229, Home represented by node 225, etc.); activities performed (e.g., a work-out session, etc.); etc. The preceding examples are illustrative and not restrictive.

For the second generation process in FIG. 1B, the metadata network 175 may include at least one moment node—for example, the moment node 220A and moment node 220B. Other embodiments of the metadata network 175, however, are not so limited. For example, the metadata network 175 can include less than two moment nodes or more than two moment nodes. For this second generation process, the DAM module/logic 140 generates the moment node 220A and the moment node 220B to represent one or more primary inferred metadata assets (e.g., an event metadata asset, etc.). The DAM module/logic 140 can determine or infer the primary inferred metadata (e.g., an event metadata asset, etc.) from one or more of the information 210, the metadata 205, the metadata 215, and other data received from external sources (e.g., weather application, calendar application, social networking application, address book application, etc.). Also, the DAM module/logic 140 may receive the primary inferred metadata assets, generate this metadata as the moment node 220A and the moment node 220B, and extract primary primitive metadata 205 and 215 from the primary inferred metadata assets represented as the moment node 220A and the moment node 220B. The primary primitive metadata assets illustrated in boxes 205 and 215 can include more or less than the metadata assets illustrated in FIG. 1B. For example, primary primitive metadata can also include altitude, relative geographical coordinates, week of the year, day of the week, month of the year, season, relative time, additional objects, additional scene descriptions, etc.

For one embodiment, the metadata network 175 also includes non-moment nodes 223, 225, 227, 229, 231, 233, 235, and 237. The DAM module/logic 140 can generate additional nodes based on moment nodes as follows: (i) the DAM module/logic 140 determines auxiliary primitive metadata assets associated with the moment nodes 220A-B by cross-referencing the auxiliary primitive metadata assets with primary primitive metadata assets and/or primary inferred metadata assets in a metadata collection; (ii) the DAM module/logic 140 determines or infers auxiliary inferred metadata assets associated with the moment nodes 220A-B based on the auxiliary primitive metadata assets, the primary primitive metadata assets, and/or the primary inferred metadata assets; and (iii) the DAM module/logic 140 generates a node for each auxiliary inferred metadata asset, each auxiliary primitive metadata asset, each primary primitive metadata asset, and/or each primary inferred metadata asset. For a first example, and as illustrated in FIG. 1B, the DAM module/logic 140 generates non-moment nodes 233, 231, 229, 235, and 237 after determining and/or inferring metadata assets associated with the moment node 220A. For a second example, the DAM module/logic 140 generates nodes 225 and 227 after determining and/or inferring metadata assets associated with the moment node 220B.

For one embodiment, the DAM module/logic 140 can refine each metadata asset associated with the moment nodes 220A-B based on a probability distribution (e.g., a discrete probability distribution, a continuous probability distribution, etc.). For example, a Gaussian distribution may be used to determine a distribution of the primary primitive metadata assets. For this example, the distribution may be used to ascertain a mean, a median, a mode, a standard deviation, and/or a variance associated with the distribution of the primary primitive metadata assets. The DAM module/logic 140 can use the Gaussian distribution to select or filter out a sub-set of the primary primitive metadata assets that is within a predetermined criterion (e.g., 1 standard deviation (68%), 2 standard deviations (95%), or 3 standard deviations (99.7%), etc.). Hence, this selection/filtering operation can assist with identifying relevant primary primitive metadata assets for DAM and with filtering out noise or unreliable primary primitive metadata assets. Consequently, all the other types of metadata (e.g., auxiliary primitive metadata assets, primary inferred metadata assets, auxiliary inferred metadata assets, etc.) that are associated with, determined from, or inferred from the primary primitive metadata assets may also be relevant and relatively noise-free. For a second example, a Gaussian distribution may be used to determine a distribution of the primary inferred metadata assets (i.e., moment nodes). For this example, the distribution may be used to ascertain a mean, a median, a mode, a standard deviation, and/or a variance associated with the distribution of the moments. The DAM module/logic 140 can use the Gaussian distribution to select or filter out a sub-set of the primary inferred metadata assets (i.e., moment nodes) that is within a predetermined criterion (e.g., 1 standard deviation (68%), 2 standard deviations (95%), or 3 standard deviations (99.7%), etc.). Hence, this selection/filtering operation can assist with identifying relevant primary inferred metadata assets (i.e., moment nodes) for DAM and with filtering out noise or unreliable primary inferred metadata assets. Consequently, all the other types of metadata (e.g., primary primitive metadata assets, auxiliary primitive metadata assets, auxiliary inferred metadata assets, etc.) that are associated with, determined from, or extracted from the primary inferred metadata assets may also be relevant and relatively noise-free.

Noise can occur due to primary primitive metadata assets that are associated one or more irrelevant DAs. Such DAs can be determined based on the number of DAs associated with a primary primitive metadata asset. For example, a primary primitive metadata asset associated with two or less DAs can be designated as noise. This is because such metadata assets (and their DAs) may be irrelevant given the little information they provide. For example, the more important or significant an event is to a user, the higher the likelihood that the event is captured using a large number of images (e.g., three or more, etc.). For this example, the probability distribution described above can enable selecting the primary primitive metadata asset associated with these DAs. This is because the number of DAs associated with the event may suggest an importance or relevance of the primary primitive metadata asset. In contrast, insignificant events may have only one or two images, and the corresponding primary primitive metadata asset may not add much to DAM based on the metadata network described herein. The immediately preceding examples are also applicable to the primary inferred metadata, the auxiliary primitive metadata, and the auxiliary inferred metadata.

For one embodiment, the DAM module/logic 140 determines a confidence weight and/or a relevance weight for at least some, and possibly each, of the primary primitive metadata assets, the primary inferred metadata assets, the auxiliary primitive metadata assets, and the auxiliary inferred metadata assets associated with the moment node 220A-B.

As used herein, a "confidence weight" and its variations refer to a value (e.g., an integer, etc.) used to describe a certainty that some metadata correctly identifies a feature or characteristic of one or more DAs associated with a moment. For example, a confidence weight of 0.6 (out of a maximum of 1.0) can be used to indicate a 60% confidence level that a feature in one or more digital images associated with a moment is a dog.

As used herein, a "relevance weight" and its variations refer to a value (e.g., an integer, etc.) used to describe an importance assigned to a feature or characteristic of one or more DAs associated with a moment as identified by a metadata asset. For example, a first relevance weight of 0.85 (out of a maximum of 1.0) can be used indicate that a first identified feature in a digital image (e.g., a person) is very important while a second relevance weight of 0.50 (out of a maximum of 1.0) can be used indicate that a second identified feature in a digital image (e.g., a dog) is not very important.

As shown in FIG. 1B, and for one example, the DAM module/logic 140 estimates that one or more metadata assets associated with the moment node 220A describe Jean Dupont's birthday. For this example, the confidence weight 239 is assigned a value of 0.8 to indicate an 80% confidence level that Jean Dupont's birthday is described by one or more metadata assets illustrated in box 205. Furthermore, and for this example, a relevance weight 239 is assigned a value of is 0.9 (out of a maximum of 1.0) to indicate that Jean Dupont's birthday is an important feature in the metadata asset(s) illustrated in box 205. For this example, the important metadata asset illustrated in box 205 can include the date associated with moment 220A, which is illustrated as May 27, 2016. The DAM module/logic 140 can compare the data shown in box 205 with Jean Dupont's known birthday 233 of May 27, 1991 to determine the confidence weight 235 and the relevance weight 235. For another example, the DAM module/logic 140 may compare Jean Dupont's known birthday 233 against some or all metadata assets of a date type until a moment (e.g., moment 220A) that includes time metadata with the same or similar date as Jean Dupont's known birthday 233 is found (e.g., the time metadata asset shown in box 205, etc.).

With specific regard to images, confidence weights and relevance weights may be detected via feature detection techniques that include analyzing metadata associated with one or more images. For one embodiment, the DAM module/logic 140 can determine confidence levels and relevance weights using metadata associated with one or more DAs by applying known feature detection techniques. Relevance can be statically defined in the metadata network from external constraints. For example, relevance can be based on information acquired from other sources, like social networking data, calendar data, etc. Also, relevance may be based on internal constraints. That is, as more detections of a metadata asset are made, its relevance can be increased. Relevance can also retard as fewer detections are made. For example, as more detections of Marie Dupont 227 are made over a predetermined period of time (e.g., an hour, a day, a week, a year, etc.), her relevance is increased to indicate her importance to Jean Dupont. Confidence can be dynamically generated based on the ingest of metadata in the metadata network. For instance, a detected person in an image may be linked with information about that person from a contacts application, a calendar application, social networking application, or other application to determine a level of confidence that the detected person is correctly identified. For a further example, the overall description of a scene in the image may be linked with geo-position information acquired from primary inferred metadata associated with the detected person to determine the level of confidence. Other examples are possible. In addition, confidence can be based on internal constraints. That is, as more detections of a metadata asset are made, its identification confidence is increased. Confidence can also retard as fewer detections are made.

The DAM module/logic 140 can generate edges representing correlations between nodes (i.e., the metadata assets) in the metadata network 175. For one embodiment, the DAM module/logic 140 determines correlations between the nodes in the metadata network 175 based on the confidence weights and the relevance weights. For a further embodiment, the DAM module/logic 140 determines correlations between nodes in the metadata network 175 based on the confidence weight between two nodes being greater than or equal to a confidence threshold and/or the relevance weight between two nodes being greater than or equal to a relevance threshold. For one embodiment, the correlation between the two nodes is determined based on a combination of the confidence weight and the relevance weight between the two nodes being equal to or greater than a threshold correlation. For example, and as shown in FIG. 1B, the DAM module/logic 140 can generate an edge 239 to indicate a correlation between the metadata asset represented by a node 233, which describes Jean Dupont's birthday and the metadata asset represented by the moment node 220A. For this example, the DAM module/logic 140 can generate the edge 239 based on the DAM module/logic 140 determining that the confidence weight associated with the edge 239 is greater than or equal to a confidence threshold and/or that the relevance weight associated with the edge 239 is greater than or equal to a relevance threshold.

Figure 2:
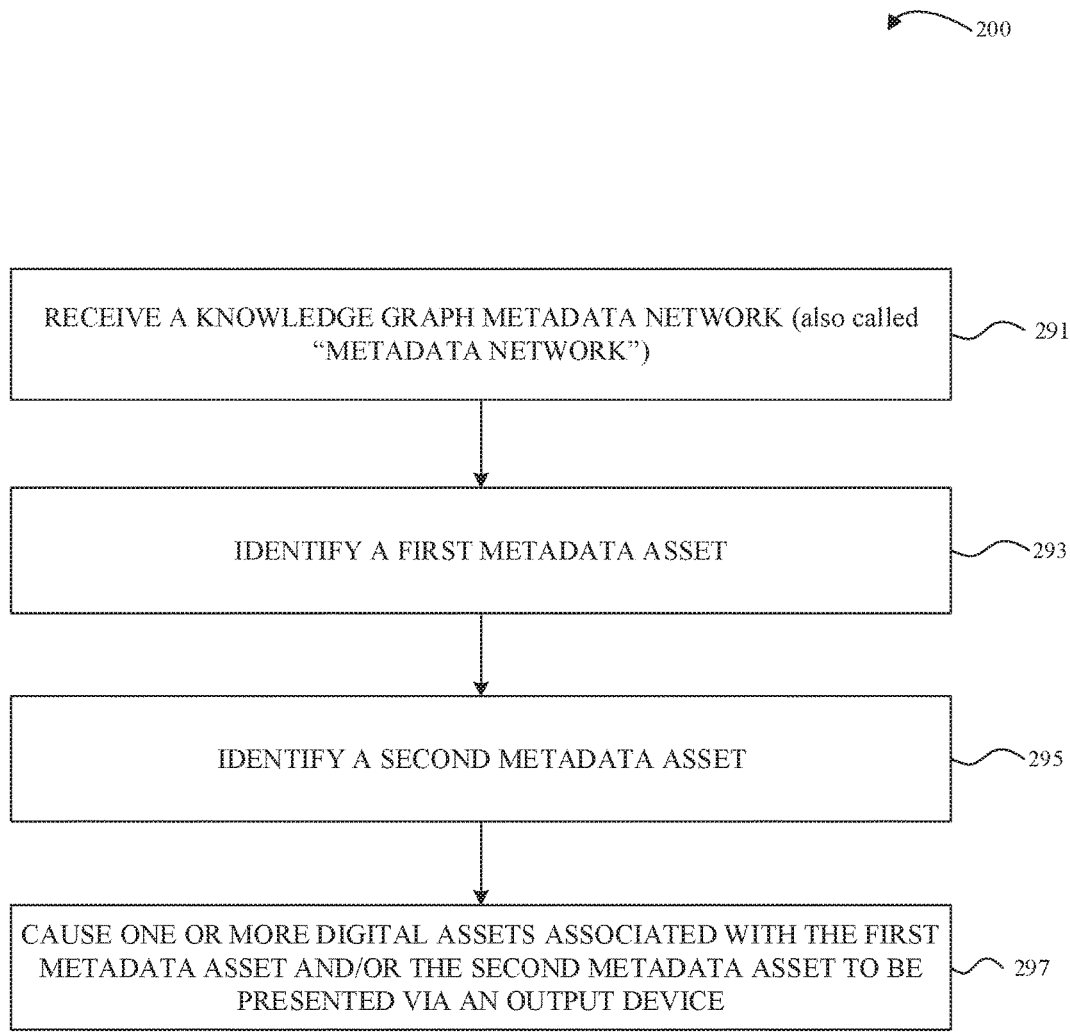
FIG. 2 is a flowchart representing an operation to perform DAM according to an embodiment.

Referring now to FIG. 2, which is a flowchart representing an operation 200 to perform DAM according to an embodiment. Operation 200 can be performed by a DAM logic/module (e.g., the DAM module/logic 140 described above in connection with FIGS. 1A-1B). Operation 200 begins at block 291, where a metadata network is received or generated. The metadata network can be similar to or the same as the metadata network 175 described above in connection with FIGS. 1A-1B. The metadata network can be obtained from memory (e.g., memory 160 described above in connection with FIG. 1A). Additionally, or alternatively, the metadata network can be generated by processing unit(s) (e.g., the processing unit(s) 130 described above in connection with FIGS. 1A-1B. Block 291 can be performed according to one or more descriptions provided above in connection with FIGS. 1A-1B. Operation 200 proceeds to block 293, where a first metadata asset (e.g., a moment node, a non-moment node, etc.) is identified in the multidimensional network representing the metadata network. For one embodiment, the first metadata asset is represented as a moment node. For this embodiment, the first metadata asset represents a first event associated with one or more DAs. At block 295, a second metadata asset is identified or detected based at least on the first metadata asset. The second metadata asset may be identified or detected in the metadata network as a second node (e.g., a moment node, a non-moment node, etc.) based on the first node used to represent the first metadata asset. For one embodiment, the second metadata asset is represented as a second moment node that differs from the first moment node. This is because the first moment node represents a first event metadata asset that describes a first event associated with one or more DAs while the second moment node represents a second event metadata asset that describes a second event associated with one or more DAs.

For one embodiment, identifying the second metadata asset (e.g., a moment node, etc.) based on the first metadata asset (e.g., a moment node, etc.) is performed by determining that the first and second metadata assets share a primary primitive metadata asset, a primary inferred metadata asset, an auxiliary primitive metadata asset, and/or an auxiliary inferred metadata asset even though some of their metadata differ. For one embodiment, the shared metadata assets between the first and second metadata assets may be selected based on the confidence and/or relevance weights between the metadata assets. The shared metadata assets between the first and second metadata asset may be selected based on the confidence and/or relevance weights being equal to or greater than a threshold level of confidence and/or relevance.

For one example, a first moment node could represent a first event metadata asset associated with multiple images that were taken at a public park in Houston, Tex. between Jun. 1, 2016 and Jun. 3, 2016. For this example, a second moment node that represents a second moment node associated with multiple images could be identified based on the first moment node. The second moment node could be identified by determining one or more other nodes (i.e., other metadata assets) that are associated with one or more images that were taken at the same public park in Houston, Tex. but on different dates (i.e., not between Jun. 1, 2016 and Jun. 3, 2016). For a variation of this example, the second moment node could be identified based on the first moment node by determining one or more other nodes (i.e., other metadata assets) associated with one or more images that were taken at another public park in Houston, Tex. but on different dates (i.e., not between Jun. 1, 2016 and Jun. 3, 2016). For yet another variation of this example, the second moment node could be identified based on the first moment node by determining one or more other nodes (i.e., other metadata assets) associated with one or more images that were taken at another public park outside Houston, Tex. but on different dates (i.e., not between Jun. 1, 2016 and Jun. 3, 2016). Operation 200 can proceed to block 297, where at least one DA associated with the first metadata asset or the second metadata asset is presented via an output device. For example, one or more images of the identified public park in Houston, Tex. can be presented on a display device.

Figure 3A:
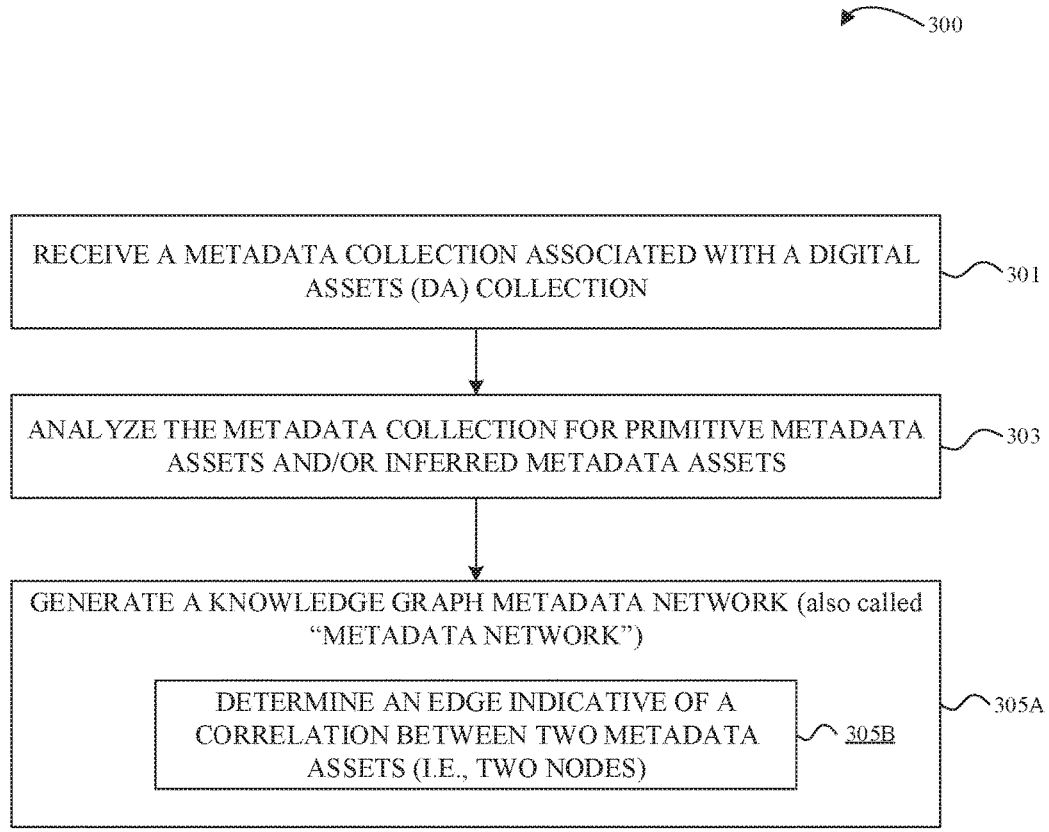
FIG. 3A illustrates, in flowchart form, an operation to generate an exemplary metadata network in accordance with an embodiment.

FIG. 3A illustrates, in flowchart form, an operation 300 to generate an exemplary metadata network for DAM in accordance with an embodiment. Operation 300 can be performed by a DAM logic/module (e.g., the DAM logic/module described above in connection with FIGS. 1A-1B, etc.). Each of blocks 301-305B can be performed in accord with descriptions provided above in connection with FIGS. 1A-2.

Operation 300 begins at block 301, where DA metadata associated with a DA collection (hereinafter "a metadata collection") is obtained or received. The metadata collection can be received or obtained from a memory (e.g., memory 160 described above in connection with FIG. 1A, etc.). For one embodiment, the metadata collection includes at least one of the following: (i) one or more primary primitive metadata assets associated with one or more DAs in the DA collection; (ii) one or more auxiliary primitive metadata assets associated with one or more DAs in the DA collection; or (iii) one or more primary inferred metadata assets associated with one or more DAs in the DA collection.

At block 303, the metadata collection is analyzed for primary primitive metadata assets, auxiliary primitive metadata assets, primary inferred metadata assets, and auxiliary inferred metadata assets. The analysis at block 303 can begin by identifying primary primitive metadata asset(s) and/or primary inferred metadata asset(s) in the metadata collection. When the metadata collection includes primary primitive metadata asset(s), such asset(s) can be used to infer at least one primary inferred metadata asset. Alternatively or additionally, when the metadata collection includes the primary inferred metadata asset(s), at least one primary metadata asset can be extracted from the primary inferred metadata asset(s). For one embodiment, the identified primary primitive metadata asset(s) and/or the identified primary inferred metadata asset(s) may be used to determine at least one auxiliary primary metadata asset or infer at least one auxiliary inferred metadata asset.

For an embodiment, the auxiliary primitive metadata asset(s) in the metadata collection may be determined by cross-referencing the primary primitive metadata asset(s) and/or the primary inferred metadata asset(s) with auxiliary primitive metadata asset(s) in the same metadata collection. For example, auxiliary primitive metadata asset(s) can be determined by cross-referencing the primary primitive metadata asset(s) and/or the primary inferred metadata asset(s) with some or all other metadata assets in the metadata collection and excluding any metadata asset in the metadata collection that is not an auxiliary primitive metadata asset until one or more auxiliary primitive metadata assets are found. For a specific example, a primary primitive metadata asset that represents a time metadata asset in a metadata collection can be used to determine an auxiliary primitive metadata asset in the same metadata collection that represents a condition associated with capturing a DA. For this example, the condition can include determining a working condition of an image sensor used to capture the DA at the specific time represented by the time metadata asset, which is determined by cross-referencing the time metadata asset with some or all other metadata assets in the metadata collection and excluding any metadata asset in the metadata collection that is not an auxiliary primitive metadata asset until one or more auxiliary primitive metadata assets are found. For this example, the located auxiliary primitive metadata assets include the auxiliary primitive metadata asset that represents the working condition of the image sensor used to capture the DA For one embodiment, the auxiliary inferred metadata asset(s) in the metadata collection may be determined or inferred based on the auxiliary primitive metadata asset(s), the primary primitive metadata asset(s), and/or the primary inferred metadata asset(s) in the same metadata collection. For one embodiment, the auxiliary inferred metadata asset(s) in the metadata collection is determined by clustering auxiliary primitive metadata asset(s), the primary primitive metadata asset(s), and/or the primary inferred metadata asset(s) in the same metadata collection with contextual or other information received from other sources. For example, clustering multiple geo-position metadata assets in a metadata collection with information from a geographic map received from a map application can be used determine a geolocation metadata asset. For another embodiment, the auxiliary inferred metadata asset(s) in the metadata collection may be determined by cross-referencing the auxiliary primitive metadata asset(s), the primary primitive metadata asset(s), and/or the primary inferred metadata asset(s) in the same metadata collection with some or all other metadata assets in the same metadata collection and excluding any metadata asset in the metadata collection that is not an auxiliary inferred metadata asset(s) until one or more auxiliary inferred metadata assets are found. It is to be appreciated that the two embodiments can be combined.

Operation 300 can proceed to blocks 305A-B where, a metadata network is generated. At blocks 305A-B, the generated metadata network can be a multidimensional network that includes nodes and edges. For one embodiment, and with specific regard to block 305A, each node represents an auxiliary inferred metadata asset, an auxiliary primitive metadata asset, a primary primitive metadata asset, or a primary inferred metadata asset (i.e., a moment). For another embodiment of block 305A, each node representing a primary inferred metadata asset may be designated as a moment node. At block 305B, the metadata network can determine and generate an edge for one or more pairs of nodes. For one embodiment, each edge indicates a correlation between its pair of metadata assets (i.e., nodes).

Figure 3B:
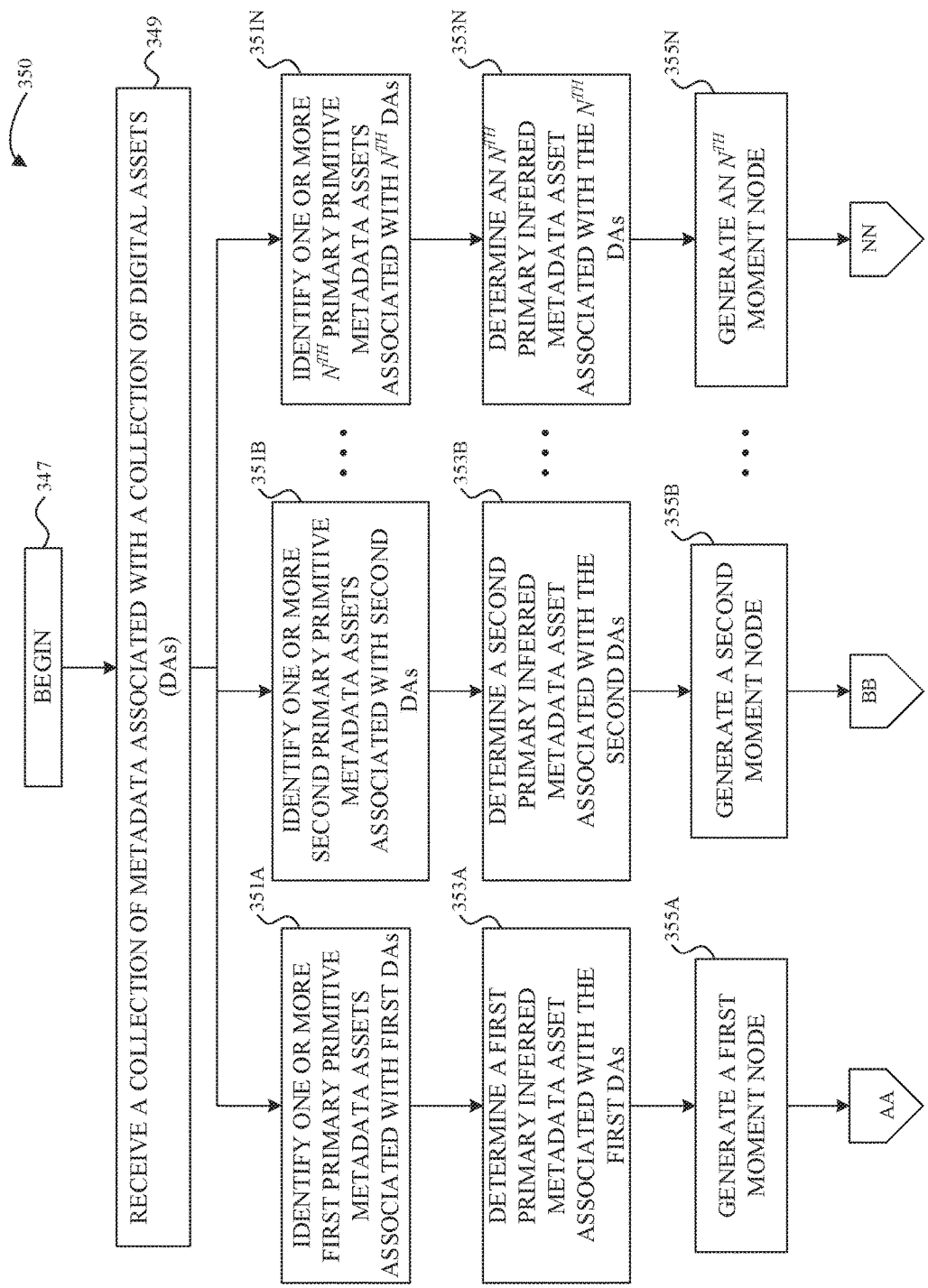
FIGS. 3B-3C illustrate, in flowchart form, an operation to generate an exemplary metadata network in accordance with an embodiment.
Figure 3C:
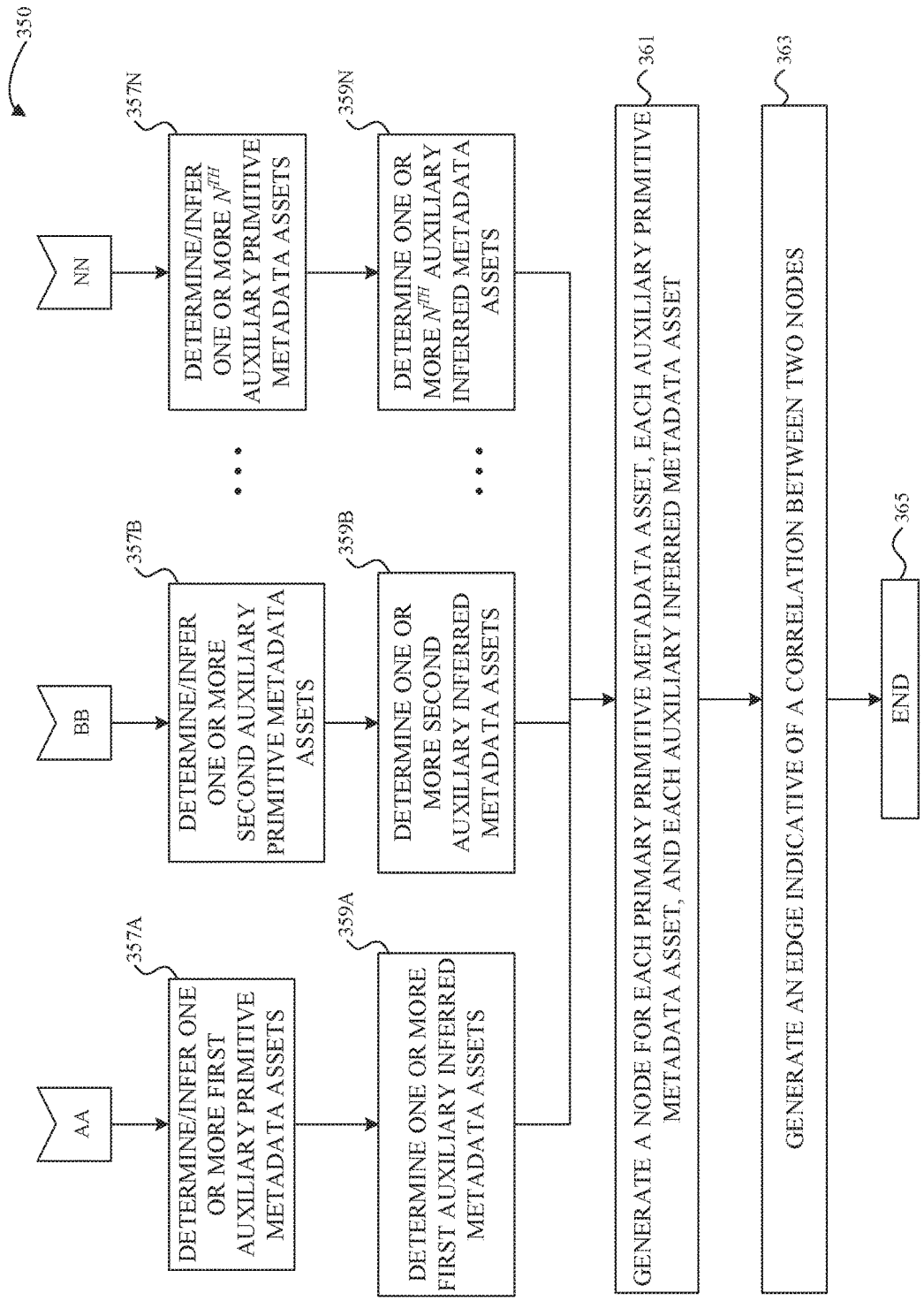

FIGS. 3B-3C illustrate, in flowchart form, an operation 350 to generate an exemplary metadata network for DAM in accordance with an embodiment. FIGS. 3B-3C provide additional details about the operation 300 illustrated in FIG. 3A. Operation 350 can be performed by a DAM logic/module (e.g., the module/logic 140 described above in connection with FIGS. 1A-1B). For one embodiment, portions of the operation 300 and 350 may be combined or omitted as desired.

Referring now to FIG. 3B, operation 350 begins at block 347 and proceeds to block 349, where a metadata collection associated with a DA collection is obtained or received. Block 349 in FIG. 3B is similar to or the same as block 301 in FIG. 3A, which is described above in connection with FIG. 3A. For brevity, this block is not described again.

As shown in FIGS. 3B-3C, there can be N number of groups, where N refers to the number of one or more DAs in the collection having their own distinct primary inferred metadata asset (i.e., moment node). For one embodiment, each group of blocks 351A-N, 353A-N, 355A-N, 357A-N, and 359A-N may be performed in parallel (as opposed to sequentially). For example, the group of blocks 351A, 353A, 355A, 357A, and 359A may be performed in parallel with the group of 351N, 353N, 355N, 357N, and 359N. Furthermore, performing the groups of blocks in parallel does not mean that each group (e.g., the group of 351A, 353A, 355A, 357A, and 359A, etc.) begins and/or ends at the same time as another group (e.g., the group of 351B, 353B, 355B, 357B, and 359B, etc.). In addition, the time taken to complete each group (e.g., the group of 351A, 353A, 355A, 357A, and 359A, etc.) can be different from the time taken to complete another group (e.g., the group of 351B, 353B, 355B, 357B, and 359B, etc.). For brevity, only the group of 351A, 353A, 355A, 357A, and 359A will be discussed below in connection with FIGS. 3B-3C.

Referring again to FIG. 3B, operation 350 proceeds to blocks 351A. At this block, a DAM module/logic performing operation 350 identifies one or more first primary primitive metadata assets. For one embodiment, the first primary primitive metadata asset(s) may be selected from the metadata collection that is obtained/received in block 349. Primary primitive metadata is described above in connection with FIGS. 1A-2.

Next, operation 350 proceeds to block 353A in FIG. 3B. Here, a DAM module/logic performing operation 350 determines a first primary inferred metadata asset (i.e., the first event metadata asset) associated with one or more first DAs based on the first primary primitive metadata asset(s) associated with the one or more first DAs. Primary inferred metadata is described above in connection with FIGS. 1A-2. Operation 350 proceeds to block 355A in FIG. 3B, where a first moment node is generated based on the first primary inferred metadata asset (e.g., the first event metadata asset, etc.).

Referring now to FIG. 3C, process 350 proceeds to block 357A. Here, one or more first auxiliary primitive metadata assets are determined or inferred from the metadata collection associated with the DA collection. For one embodiment, block 357A is performed in accordance with one or more of FIGS. 1-3B, which are described above.

At block 359A, one or more first auxiliary inferred metadata assets may be determined or inferred based on the first auxiliary primitive metadata asset(s), the first primary primitive metadata asset(s), and/or the first primary inferred metadata asset. Next, operation 350 proceeds to block 361. Here, a DAM module/logic performing operation 350 may generate a node for each primary primitive metadata asset, each auxiliary primitive metadata asset, and each auxiliary inferred metadata asset. That is, for each Nth group, a node may be generated for each primary primitive metadata asset, each auxiliary primitive metadata asset, and each auxiliary inferred metadata asset. Also, at block 363 of FIG. 3C, an edge representing a correlation between two metadata assets (i.e., two nodes) may be determined and generated. For one embodiment, the edge is determined and generated as described in connection with at least FIG. 1B and FIG. 3D. For one embodiment, operation 350 is performed iteratively and ends at block 365 after no additional nodes can be generated and no additional edges can be generated.

Figure 3D:
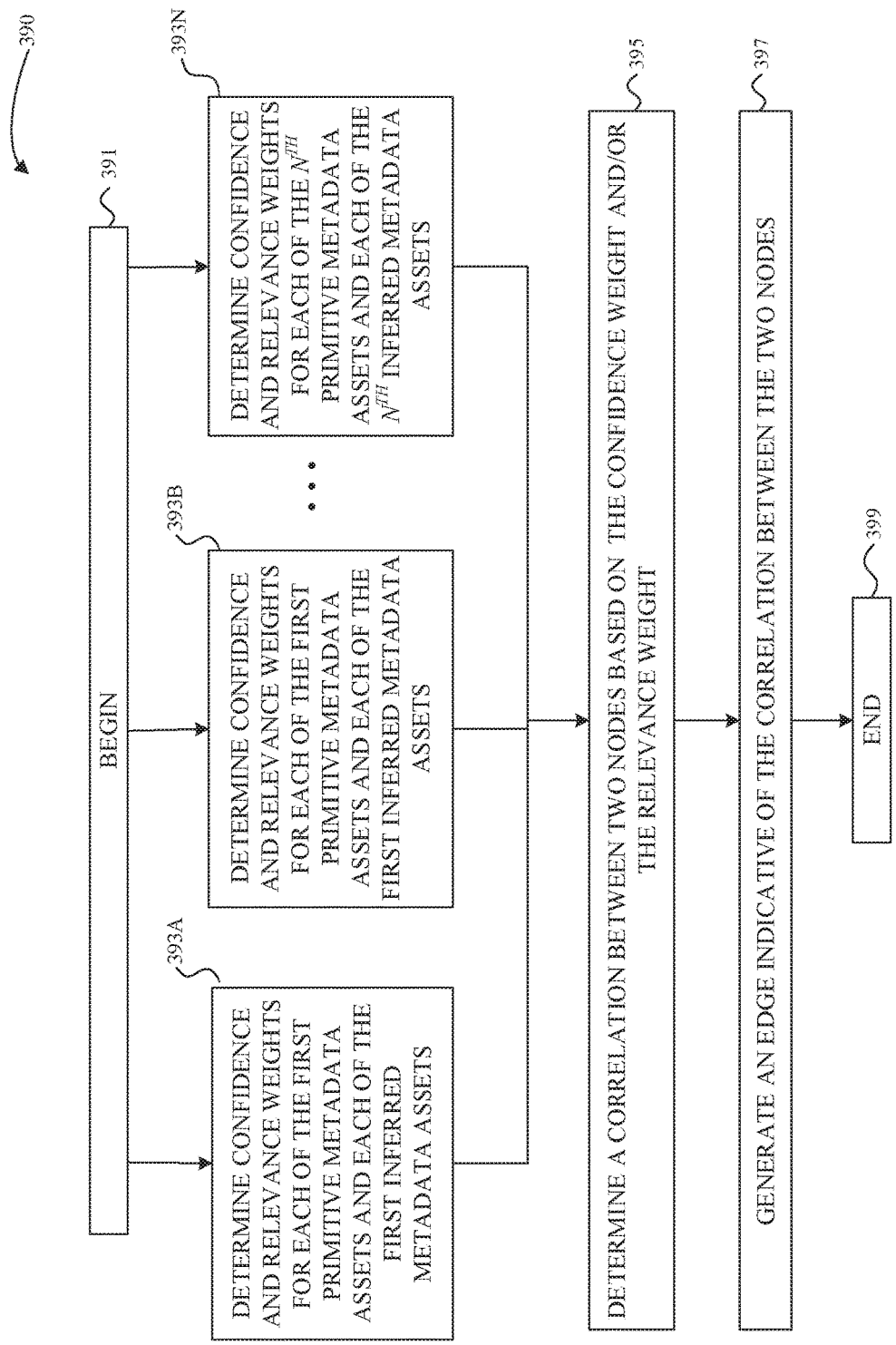
FIG. 3D illustrates, in flowchart form, an operation to generate one or more edges between nodes in a metadata network in accordance with an embodiment.

FIG. 3D illustrates, in flowchart form, an operation 390 to generate one or more edges between nodes in a metadata network for DAM in accordance with an embodiment. FIG. 3D provides additional details about the block 363 of operation 350 described above in connection with FIGS. 3B-3C. Operation 390 can be performed by a DAM logic/module (e.g., the module/logic 140 described above in connection with FIGS. 1A-1B). For one embodiment, operation 390 begins at block 391 and proceeds to blocks 393A-N, where N refers to the number of one or more DAs in the DA collection having their own distinct primary inferred metadata asset (i.e., moment node). For brevity, only block 393A is described below in connection with FIG. 3C. Block 393A requires determining confidence weights and relevance weights for each of the first primitive metadata assets (i.e., the primary primitive metadata asset(s) and the auxiliary primitive metadata asset(s), etc.) and each of the first inferred metadata assets (i.e., the primary inferred metadata asset and the auxiliary inferred metadata asset(s), etc.). Confidence weights and relevance weights are described above in connection with one or more of FIGS. 1A-3B.

At block 395 of FIG. 3D, a DAM logic/module performing operation 390 may determine, for each pair of nodes, whether a correlation exists between the two nodes. For one embodiment, this determination includes determining that a set of two nodes is correlated when at least one of the following occurs: (i) the confidence weight between the two nodes exceeds a threshold confidence; (ii) the relevance weight between the at least two nodes exceeds a threshold relevance; or (iii) a combination of the confidence weight and the relevance weight exceeds a threshold correlation. Combinations of the confidence and relevance weights include, but are not limited to, a sum of the two weights, a product of the two weights, an average of the two weights, a median of the two weights, and a difference between the two weights. Next, operation 390 proceeds to block 397, where a DAM logic/module performing operation 390 generates an edge between the correlated nodes in the multidimensional network representing the KB. For one embodiment, operation 390 is performed iteratively and ends at block 399 when no more additional edges can be generated between two nodes.

One or more of operations 300, 350, and 390 described above in connection with FIGS. 3A-3D, respectively can be used to update the metadata network 175 described above in connection with FIGS. 1A-2. For example, a DAM module/logic 140 updates the metadata network 175 using one or more of operations 300, 350, and 390 as the DAM module/logic 140 obtains or receives new primitive metadata 170 and/or as the DAM module/logic 140 determines or infers new inferred metadata 170 based on the new primitive metadata 170.

Figure 4:
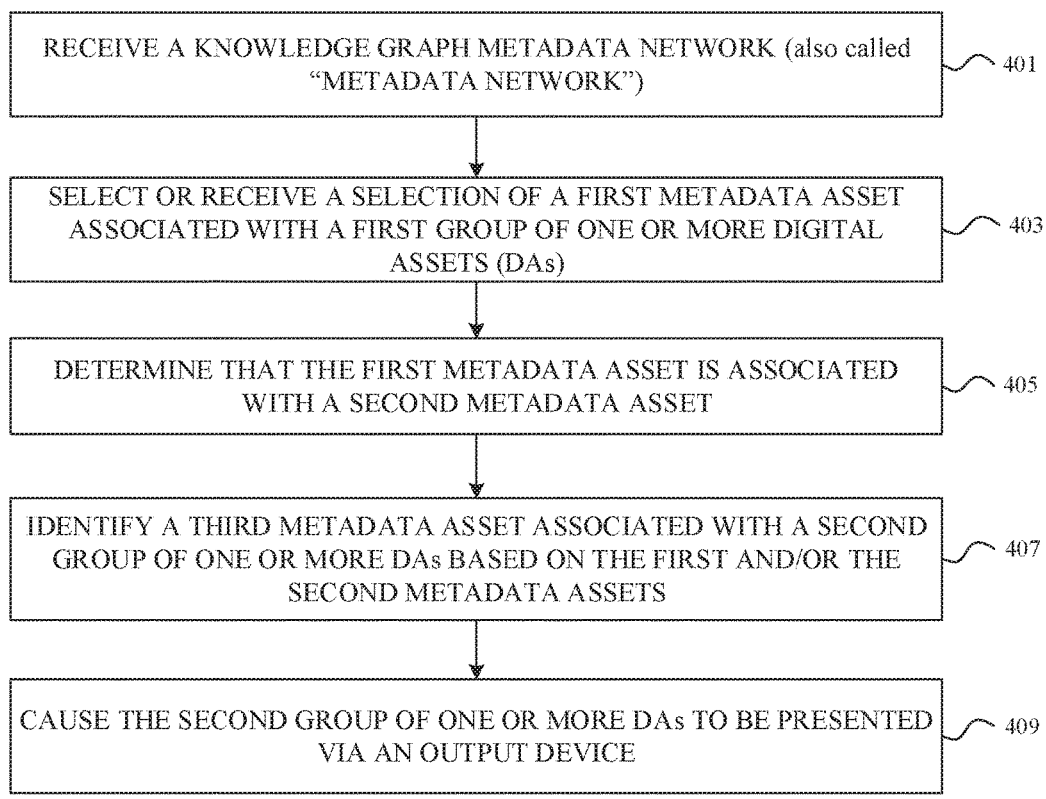
FIG. 4 is a flowchart representing an operation to relate and present at least two digital assets (DAs) from a collection of DAs (DA collection) according to one embodiment.

Referring now to FIG. 4, which is a flowchart representing one embodiment of an operation 400 to relate and/or present at least two digital assets (DAs) from a collection of DAs (DA Collection) in accord with one embodiment. Operation 400 can be performed by a DAM logic/module (e.g., the module/logic 140 described above in connection with FIGS. 1A-1B). Operation 400 begins at block 401, where a metadata network is obtained or received as described above in connection with FIGS. 1A-3C.

Operation 400 proceeds to block 403, where a DAM logic/module performing operation 400 may select a first metadata asset that is represented as a node in the metadata network. The first metadata asset may be a non-moment node or a moment node. For one embodiment, the first metadata asset (i.e., the selected node) can represent a primary primitive metadata asset, a primary inferred metadata asset, an auxiliary primitive metadata asset, or an auxiliary inferred metadata asset associated one or more DAs in a DA collection. For example, when a user is consuming or perceiving a DA (e.g., a single DA, a group of DAs, etc.) via an output device (e.g., a display device, an audio output device, etc.), then a user-input indicating a selection of the DA can trigger a selection of a specific metadata asset associated with the DA in the metadata network. Alternatively, or additionally, a user interface may be provided to the user to enable the user to select a specific metadata asset associated with one or more DAs from a group of metadata assets associated with the one or more DAs. Exemplary user interfaces include, but are not limited to, graphical user interfaces, voice user interfaces, object-oriented user interfaces, intelligent user interfaces, hardware interfaces, touch user interfaces, touchscreen devices or systems, gesture interfaces, motion tracking interfaces, and tangible user interfaces. The user interface may be presented to the user in response to the user selecting the specific DA. One or more specific examples of a user interface can be found in U.S. Provisional Patent Application No. 62/349,109, entitled "USER INTERFACES FOR RETRIEVING CONTEXTUALLY RELEVANT MEDIA CONTENT," filed Jun. 12, 2016, which is incorporated by reference in its entirety.

For one embodiment, operation 400 includes block 405. At this block, a determination may be made that the first metadata asset (i.e., the selected node) is associated with a second metadata asset that is represented as a second node in the metadata network. The second node can be a moment node or a non-moment node. For example, the second metadata asset can be a first moment node. For this example, the determination may include determining that at least one of the primary primitive metadata asset(s), the auxiliary primitive metadata asset(s), or the auxiliary inferred metadata asset(s) represented by the selected node (i.e., the first metadata asset) corresponds to the second metadata asset (i.e., the first moment node).

At block 407, a third metadata asset can be identified based on the first metadata asset (i.e., the selected node) and/or the second metadata asset (i.e., the second node). The third metadata asset can be represented as a third node in the metadata network. The third node may be a moment node or a non-moment node. For example, the third metadata asset can be represented as a second moment node that is different from the first moment node in the immediately preceding example (i.e., the second metadata asset). At block 409, at least one DA associated with the third metadata asset (e.g., the second moment node in the metadata network, etc.) may be presented via an output device. In this way, operation 400 can assist with relating and presenting one or more DAs in a DA collection based on their metadata.

Figure 5:
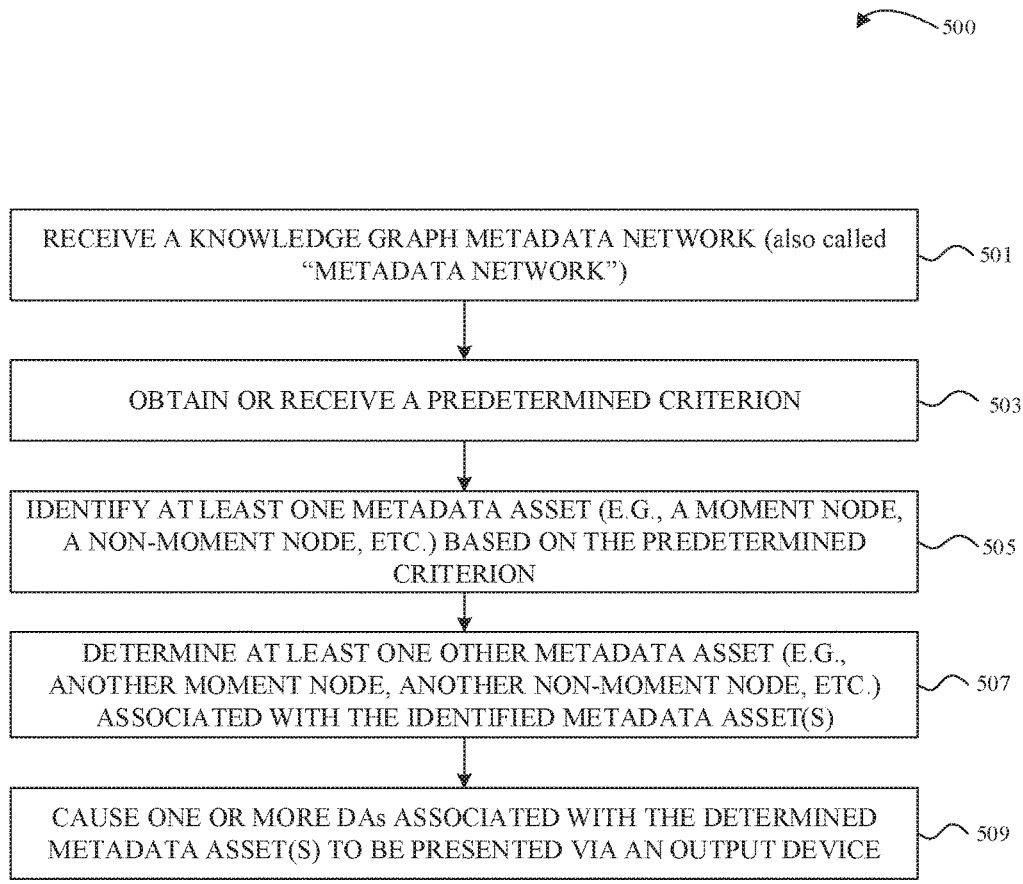
FIG. 5 is a flowchart representing an operation to determine and present at least two digital assets (DAs) from a DA collection based on a predetermined criterion in accordance with one embodiment.

FIG. 5 is a flowchart representing an operation 500 to determine and present at least two digital assets (DAs) from a DA collection based on a predetermined criterion in accordance with one embodiment. A DAM logic/module can perform operation 500 (e.g., the module/logic 140 described above in connection with FIGS. 1A-1B, etc.). For one embodiment, a DAM logic/module performs operation 500 to determine and/or present one or more DAs based on a predetermined criterion and one or more notable moments (i.e., one or more event metadata assets). For example, if the predetermined criterion requires a date from one or more previous years that share the same day as today, then a DAM logic/module performs operation 500 to determine and/or present one or more DAs associated with one or more notable moments (i.e., one or more event metadata assets) that share the same day as today. For one embodiment, the predetermined criterion includes contextual information.

Operation 500 begins at block 501, where a DAM logic/module performing operation 500 obtains or receives a metadata network. One or more embodiments of metadata networks are described above in connection with FIGS. 1A-4. At block 503, a predetermined criterion is received. For one embodiment, the predetermined criterion may be based on contextual information. Context and contextual information are described above. Process 500 proceeds to block 505, where a DAM logic/module performing operation 500 may determine that one or more metadata assets that are represented as nodes in the metadata network satisfy the predetermined criterion. The nodes that satisfy the predetermined criterion can be moment nodes or non-moment nodes. For one embodiment, the identified nodes match the criterion. For example, the predetermined criterion can include a geolocation that will be visited by a user during a future time period. Thus, for this example, one or more nodes that include the geolocation specified by the predetermined criterion can be identified in the metadata network.

For one embodiment, the predetermined criterion can be based on one or more metadata assets that represent a break in a user's habits. For this embodiment, the predetermined criterion can be determined by identifying one or more metadata assets having a low rate of occurrence based on an analysis of metadata assets of that metadata type. For example, a count and/or comparison of all time metadata assets in a metadata collection reveals that the lowest number of time metadata assets are those having times between 12:00 AM and 5:00 AM every day. Consequently, and for this example, the times between 12:00 AM and 5:00 AM every day can be specified as the predetermined criterion. Using the predetermined criterion described above to identify a break in a user's habits can identify metadata assets associated with one or more interesting DAs (e.g., one or more images that represent a break in a user's daily routine, etc.). Exemplary predetermined criterion representing a break in a user's habits include, but are not limited to, visiting a geolocation that has never been visited before (e.g., a first day in Hawaii, etc.), visiting a geolocation that has not been visited in an extended time (e.g., a trip to your birthplace after being away for more than a month, a year, 6 months, etc.), and an outing with one or more identified persons that have not been interacted with for an extended time (e.g., a dinner with childhood friends you haven't seen in over a month, a year, 6 months, etc.).

Operation 500 proceeds to block 507. At this block, a determination may be made that the identified metadata data asset(s), which are represented as node(s) in the metadata network, are associated with one or more other metadata data asset(s). These other metadata asset(s) could be moment nodes or non-moment nodes that are represented in the metadata network. For one embodiment, the identified node(s) in block 505 can be used to determine one or more moment nodes in block 507. For example, one of the identified node(s) in block 505 can represent a metadata asset that describes a geolocation to be attended by the user. Thus, for this example, one or more moments nodes that represent event metadata asset(s) associated with the geolocation specified by a predetermined criterion can be determined in the metadata network at block 507. The determined metadata asset(s) in block 507 can be used to identify one or more DAs in the DA collection. At block 509, the identified DA(s) associated with the determined metadata asset(s) in block 507 can be presented via an output device (e.g., a display device, an audio output device, etc.) for consumption by a user of the device.

Figure 6:
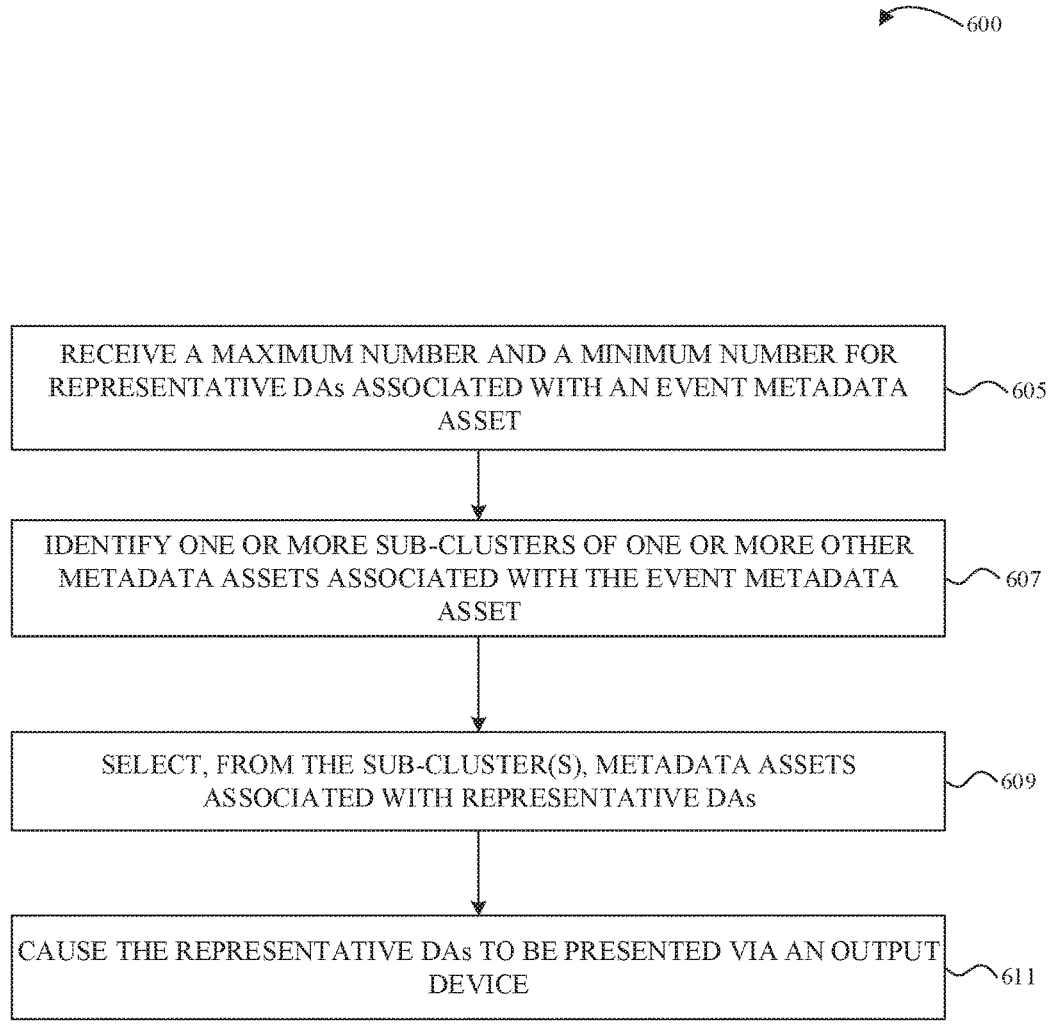
FIG. 6 is a flowchart representing an operation to determine and present representative digital assets (DAs) for a moment according to one embodiment.

FIG. 6 is a flowchart representing an operation 600 to determine and present a representative set of digital assets (DAs) for a moment according to one embodiment. For one embodiment, operation 600 is performed on metadata assets associated with a group of DAs that share the same event metadata. Thus, for this embodiment, the metadata networks described above are not always required. Other embodiments, however, perform operation 600 on one or more moment nodes in a metadata network. For brevity, operation 600 will be described in connection with a moment (i.e., an event metadata asset) in a metadata network.

Operation 600 can be performed by a DAM logic/module to curate one or more representative DAs associated with an event metadata asset that is represented as a moment node in a metadata network. As used herein, "curation" and its variations refer to determining and/or presenting a representative set of DAs for summarizing the one or more DAs associated with a moment. For example, if there are fifty images associated with a moment, then a curation of the moment can include determining and/or presenting ten images summarizing the fifty DAs associated with the moment.

Operation 600 begins at block 605, where a DAM logic/module performing operation 600 obtains or receives a maximum number of DAs to be used for representing the DAs associated with a moment (i.e., an event metadata asset) that is represented as a moment node in a metadata network and a minimum number of DAs to be used for representing the DAs associated with the moment (i.e., the event metadata asset) that is represented as the moment node in the metadata network. For one embodiment, the maximum and minimum numbers can be received via user input provided through an input device (e.g., peripheral(s) 190 described above in connection with FIG. 1A, input device(s) 706 described below in connection with FIG. 7, etc.). For another embodiment, the maximum and minimum numbers can be predetermined numbers that are applied automatically by the DAM logic/module performing operation 600. These predetermined numbers can be set when developing the DAM logic/module that performs operation 600 or through an input provided via a user interface (e.g., through a user preferences setting, etc.). For one embodiment, the maximum and minimum numbers can be determined dynamically based on processing operations performed by computational resources associated with the DAM logic/module. For example, as more computational resources become available, the maximum and minimum numbers can be increased or decreased.

At block 607, one or more other metadata assets associated with the selected moment may be identified and further classified into multiple sub-clusters. The one or more other metadata assets may include primary primitive metadata assets, auxiliary primitive metadata assets, and/or auxiliary inferred metadata assets that correspond to the moment (i.e., the event metadata asset) that is represented as the moment node in the metadata network. For one embodiment, the one or more other metadata assets are identified using their corresponding nodes in the metadata network. For one embodiment, block 607 also includes determining a time period spanned by the other metadata assets associated with the selected moment and determining whether this time period is greater than or equal to a predetermined threshold. This predetermined threshold is used to differentiate collections of metadata assets that represent a short moment (e.g., a birthday party spanning three hours, etc.) from collections of metadata assets that represent a longer moment (e.g., a vacation trip spanning a week, etc.). Curation settings can be used to select representative DAs for collections of metadata assets that represent longer moments. When the time period spanned by the other metadata assets associated with the selected moment is greater than or equal to a predetermined threshold, the other metadata assets associated with the selected moment may be considered a dense cluster. Alternatively, when a time period spanned by the other metadata assets associated with the selected moment fails to exceed the predetermined threshold, the other metadata assets associated with the selected moment may be considered a diffused or sparse cluster. For one embodiment, when a dense cluster is determined, operation 500 (as described above) may be used to select and present the DAs associated with selected moment via an output device. In contrast, when a diffused or sparse cluster is determined, the other metadata assets associated with the selected moment may be ordered sequentially. For one embodiment, sequentially ordering the other metadata assets may be based on at least one a capture time, a modification time, or a save time. After the other metadata assets associated with the selected moment are ordered, block 607 includes applying a clustering technique based on time and spatial distances between the selected moment's metadata assets (i.e., the other metadata assets). Examples of such clustering techniques include, but are not limited to, exclusive clustering algorithms, overlapping clustering algorithms, hierarchical clustering, and probabilistic clustering algorithms. For one embodiment, time may be the base vector used for the clustering technique and the spatial distances between the selected moment's metadata assets may be a function of the time.

For one embodiment, block 607 may include iteratively applying a first density-based data clustering algorithm to the results of the clustering technique described above. For one embodiment, the first density-based data clustering algorithm includes the "density-based spatial clustering of applications with noise" or DBSCAN algorithm. For one embodiment, the DBSCAN algorithm may be applied to determine or infer sub-clusters of the selected moment's metadata assets while avoiding outlier metadata assets. Such outliers typically lie in low density regions. For one embodiment, block 607 may also include applying a second density-based data-clustering algorithm to the results of the first density-based data-clustering algorithm. For one embodiment, the second density-based data-clustering algorithm can include the "ordering points to identify the clustering structure" or OPTICS algorithm. For one embodiment, the OPTICS algorithm may be applied to results of the DBSCAN algorithm to detect meaningful sub-clusters of the other metadata assets associated with the selected moment. The OPTICS algorithm linearly orders the other metadata assets associated with the selected moment such that metadata assets that are spatially closest to each other become neighbors. Additionally, a special distance may be stored for each sub-cluster of the other metadata assets. This special distance can represent the maximum spatial distance between two metadata assets that needs to be accepted for a sub-cluster in order to have two or more metadata assets be deemed as belonging to that sub-cluster. That is, any two metadata assets whose spatial distance exceeds the special distance are not considered part of the same sub-cluster. For one embodiment, block 607 also includes applying a weight to each metadata asset in each sub-cluster that results from applying the OPTICS algorithm. For example, the weight can be a score between 0.0 and 1.0, where each metadata asset in each sub-cluster has a starting score of 0.5. Block 607 may further include applying at least one heuristic function to determine a representative weight for each determined sub-cluster based on the individual weights within each sub-cluster.

Operation 600 proceeds to block 609, where metadata assets are selected from the identified sub-cluster(s). The selected metadata assets correspond to or identify the representative DAs. For one embodiment, block 609 includes applying an adaptive election algorithm to select or filter a sub-set of the sub-clusters determined in block 607. The number of sub-clusters in the sub-set may be equal to the maximum number described above in connection with block 605. Block 609 can also include determining a percentage of representative DAs that can be contributed by each sub-cluster in the sub-set to the maximum number described above in connection with block 605. For example, if there are two sub-clusters in the sub-set and the first sub-cluster has metadata assets associated with 20 DAs while the second sub-cluster has metadata assets associated with 10 DAs, then the first sub-cluster can contribute 75% of its DAs to the maximum number of representative DAs and the second sub-cluster can contribute 25% of its DAs to the maximum number of representative DAs. For one embodiment, when the number of representative DAs a sub-cluster can contribute to the representative DAs is less than the minimum number described above in connection with block 605, that sub-cluster may be removed from consideration. Thus, and with regard to the immediately preceding example, if 25% of the DAs that can be contributed by the second sub-cluster is less than the minimum number described above in connection with block 605, then the second sub-cluster may be removed from consideration. For one embodiment, determining the maximum number that each sub-cluster in the sub-set can contribute to the number of representative DAs may be performed iteratively until each sub-cluster can contribute at least the minimum number described above in connection with block 605.

At block 609, hierarchical cluster analysis (e.g., agglomerative clustering, divisive clustering, etc.) can be performed on the sub-clusters that can contribute a number of their DAs to the representative DAs. Exemplary agglomerative clustering techniques include, but are not limited to, hierarchical agglomerative clustering (HAC) techniques. Exemplary divisive clustering techniques include, but are not limited to, k-mean clustering techniques (where k is equal to the number of DAs associated with a sub-cluster that can be contributed to the total number of representative DAs and where k is at least equal to the minimum number described above in connection with block 605). For one embodiment, the selected metadata assets associated with DAs in a sub-cluster that can be contributed to the total number of representative DAs are then filtered for redundancies and noise. Here, noisy metadata assets may be assets that have incomplete information or are otherwise not associated with the selected moment. After the redundant and noisy metadata assets are removed, the DAs associated with the unremoved metadata assets may be deemed the total number of representative DAs. For one embodiment, this total number of the one or more representative DAs is (i) less than or equal to the maximum number from block 605 and (ii) greater than or equal to the minimum number from block 605. As shown in block 611, the DAs associated with the unremoved metadata assets can be presented on an output device as the representative DAs.

Figure 7:
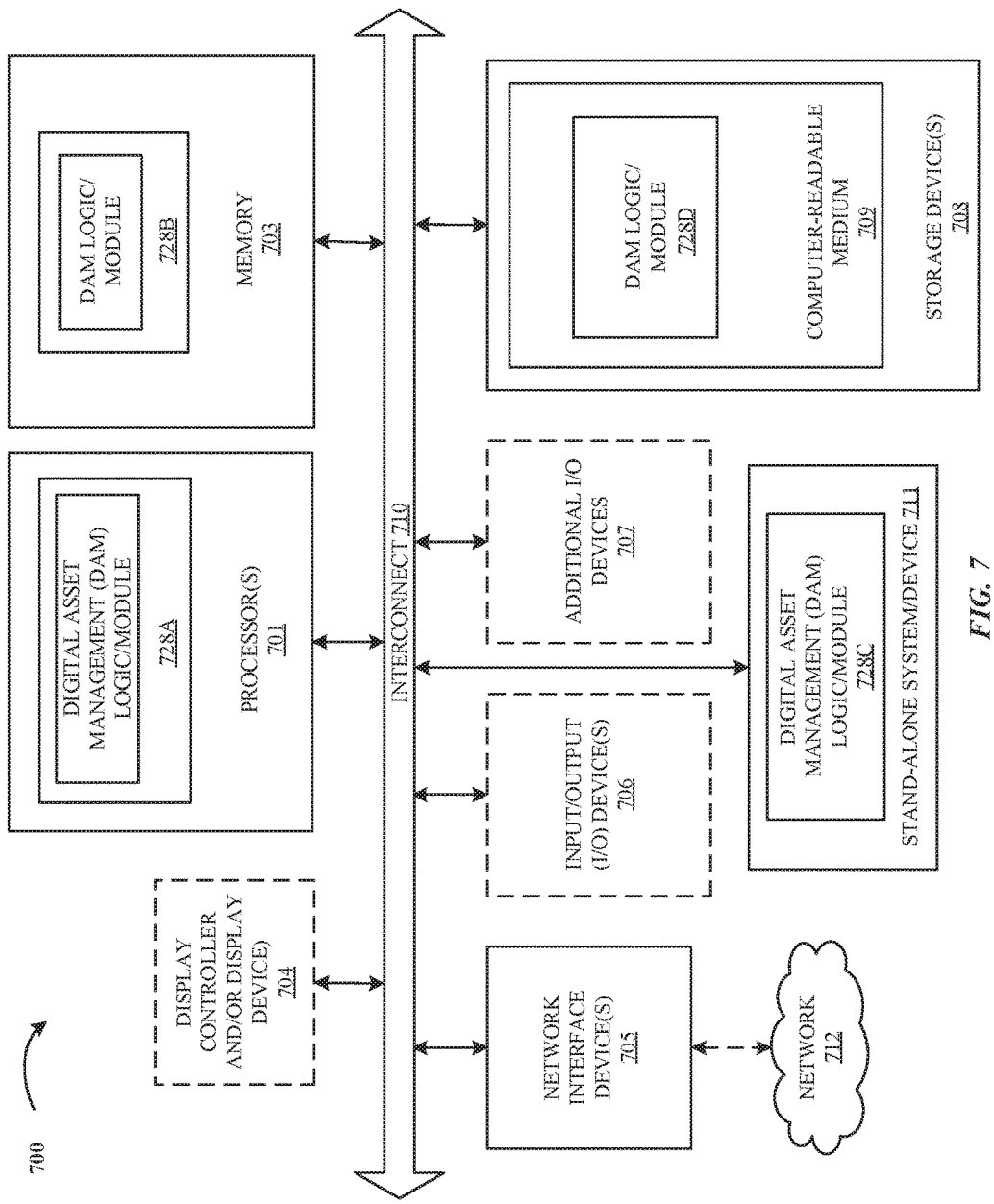
FIG. 7 illustrates an exemplary processing system for DAM according to one or more embodiments described herein.

FIG. 7 is a block diagram illustrating an exemplary data processing system 700 that may be used with one or more of the described embodiments. For example, the system 700 may represent any data processing system (e.g., one or more of the systems described above performing any of the operations or methods described above in connection with FIGS. 1A-6, etc.). System 700 can include many different components. These components can be implemented as integrated circuits (ICs), portions thereof, discrete electronic devices, or other modules adapted to a circuit board such as a motherboard or add-in card of a computer system, or as components otherwise incorporated within a chassis of a computer system. Note also that system 700 is intended to show a high-level view of many, but not all, components of the computer system. Nevertheless, it is to be understood that additional components may be present in certain implementations and furthermore, different arrangements of the components shown may occur in other implementations. System 700 may represent a desktop computer system, a laptop computer system, a tablet computer system, a server computer system, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute instructions to perform any of the methodologies discussed herein.

For one embodiment, system 700 includes processor(s) 701, memory 703, devices 705-709, and device 711 via a bus or an interconnect 710. System 700 also includes a network 712. Processor(s) 701 may represent a single processor or multiple processors with a single processor core or multiple processor cores included therein. Processor(s) 701 may represent one or more general-purpose processors such as a microprocessor, a central processing unit (CPU), graphics processing unit (GPU), or the like. More particularly, processor(s) 701 may be a complex instruction set computer (CISC), a reduced instruction set computer (RISC) or a very long instruction word (VLIW) computer architecture processor, or processors implementing a combination of instruction sets. Processor(s) 701 may also be one or more special-purpose processors such as an application specific integrated circuit (ASIC), an application-specific instruction set processor (ASIP), a cellular or baseband processor, a field programmable gate array (FPGA), a digital signal processor (DSP), a physics processing unit (PPU), an image processor, an audio processor, a network processor, a graphics processor, a graphics processing unit (GPU), a network processor, a communications processor, a cryptographic processor, a co-processor, an embedded processor, a floating-point unit (FPU), or any logic that can process instructions.

Processor(s) 701, which may be a low power multi-core processor socket such as an ultra-low voltage processor, may act as a main processing unit and central hub for communication with the various components of the system. Such processor(s) can be implemented as one or more system-on-chip (SoC) integrated circuits (ICs). A digital asset management (DAM) logic/module 728A may reside, completely or at least partially, within processor(s) 701. In one embodiment, the DAM logic/module 728A enables the processor(s) 701 to perform any or all of the operations or methods described above in connection with FIGS. 1A-6. Additionally or alternatively, the processor(s) 701 may be configured to execute instructions for performing the operations and methodologies discussed herein.

System 700 may further include a graphics interface that communicates with optional graphics subsystem 704, which may include a display controller, a graphics processing unit (GPU), and/or a display device. Processor(s) 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor(s) 701 or any other device. For example, executable code and/or data from a variety of operating systems, device drivers, firmware (e.g., input output basic system or BIOS), and/or applications can be loaded in memory 703 and executed by processor(s) 701. An operating system can be any kind of operating system. A DAM logic/module 728D may also reside, completely or at least partially, within memory 703.

For one embodiment, the memory 703 includes a DAM logic/module 728B as executable instructions. For another embodiment, when the instructions represented by DAM logic/module 728B are executed by the processor(s) 701, the instructions cause the processor(s) 701 to perform any, all, or some of the operations or methods described above in connection with FIGS. 1A-6.

System 700 may further include I/O devices such as devices 705-708, including network interface device(s) 705, optional input device(s) 706, and other optional I/O device(s) 707. Network interface device 705 may include a wired or wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with display device 704), a pointer device such as a stylus, and/or a keyboard (e.g., a physical keyboard or a virtual keyboard displayed as part of a touch sensitive screen). For example, input device 706 may include a touch screen controller coupled to a touch screen. The touch screen and touch screen controller can, for example, detect contact and movement or a break thereof using one or more touch sensitivity technologies, including but not limited to capacitive, resistive, infrared, and surface acoustic wave technologies, as well as other proximity sensor arrays or other elements for determining one or more points of contact with the touch screen.

I/O devices 707 may include an audio device. An audio device may include a speaker and/or a microphone to facilitate voice-enabled functions, such as voice recognition, voice replication, digital recording, and/or telephony functions. Other I/O devices 707 may include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage for information such as data, applications, one or more operating systems and so forth, a mass storage device or devices (not shown) may also coupled to processor(s) 701. For various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor(s) 701, e.g., via a serial optional peripheral interface (SPI). This flash device may provide for non-volatile storage of system software, including a basic input/output software (BIOS) and other firmware.

A DAM logic/module 728C may be part of a specialized stand-alone computing system/device 711 that is formed from hardware, software, or a combination thereof. For one embodiment, the DAM logic/module 728C performs any, all, or some of the operations or methods described above in connection with FIGS. 1A-6.

Storage device 708 may include computer-accessible storage medium 709 (also known as a machine-readable storage medium or a computer-readable medium) on which is stored one or more sets of instructions or software—e.g., a DAM logic/module 728D.

For one embodiment, the instruction(s) or software stored on storage medium 709 embody one or more methodologies or functions described above in connection with FIGS. 1A-6. For another embodiment, the storage device 708 includes a DAM logic/module 728D as executable instructions. When the instructions represented by a DAM logic/module 728D are executed by the processor(s) 701, the instructions cause the system 700 to perform any, all, or some of the operations or methods described above in connection with FIGS. 1A-6.

Computer-readable storage medium 709 can store some or all of the software functionalities of a DAM logic/module 728A-D described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the system 700 and that cause the system 700 to perform any one or more of the disclosed methodologies. The term "computer-readable storage medium" shall accordingly be taken to include, but not be limited to, solid-state memories, and optical and magnetic media, or any other non-transitory machine-readable medium.

Note that while system 700 is illustrated with various components of a data processing system, it is not intended to represent any particular architecture or manner of interconnecting the components; as such, details are not germane to the embodiments described herein. It will also be appreciated that network computers, handheld computers, mobile phones, servers, and/or other data processing systems, which have fewer components or perhaps more components, may also be used with the embodiments described herein.

In the foregoing description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specification and drawings are, accordingly, to be regarded in an illustrative sense rather than a restrictive sense.

In the development of any actual implementation of one or more of the disclosed concepts (e.g., such as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming, but may still be a routine undertaking for a person having ordinary skill in the art in the design and/or implementation of one or more of the inventive concepts set forth in the embodiments described herein.

One aspect of the present technology is the gathering and use of data available from various sources to improve the operation of the metadata network. The present disclosure contemplates that in some instances, this gathered data may include personal information data that uniquely identifies a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to improve the metadata assets and enable identifying correlation between metadata nodes. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of the present metadata network, the present technology can be configured to allow users to select to "opt in" or "opt out" of participation in the collection of personal information data for use as metadata assets in the metadata network.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

As used in the description above and the claims below, the phrase "at least one of A, B, or C" includes A alone, B alone, C alone, a combination of A and B, a combination of B and C, a combination of A and C, and a combination of A, B, and C. That is, the phrase "at least one of A, B, or C" means A, B, C, or any combination thereof such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B and/or C" is equal to "at least one of A, B or C."

Also, the use of "a" refers to "one or more" in the present disclosure. For example, "a DA" refers to "one or more DAs."

What is claimed is:

1. A computer-implemented method for generating a metadata network for digital asset management, comprising:
    obtaining, by a processor, a collection of metadata assets describing characteristics associated with digital assets (DAs) in a DA collection;
    identifying one or more first metadata assets in the collection of metadata assets, wherein each first metadata asset comprises a moment;
    generating nodes in the metadata network to represent at least some of the metadata assets associated with the DA collection;
    determining, for at least two of the metadata assets, a correlation between the at least two metadata assets, wherein determining the correlation between the at least two metadata assets includes determining, for at least one of the at least two metadata assets, at least one confidence weight, wherein the at least one confidence weight is indicative of an estimated level of certainty that an element of one or more DAs has been properly identified by a corresponding metadata asset;
    determining, for at least one of the at least two metadata assets, a relevance weight, wherein the relevance weight is indicative of an importance of the at least one of the at least two metadata assets, and wherein the relevance weight is configured to change over time based, at least in part, on a number of detections of the at least one of the at least two metadata assets in the metadata network; and
    generating an edge in the metadata network between the nodes that represent the at least two metadata assets, the edge representing the determined correlation.

2. The computer-implemented method of claim 1, wherein each metadata asset describes at least one DA in the DA collection.

3. The computer-implemented method of claim 2, wherein each metadata asset describes a group of DAs in the DA collection.

4. The computer-implemented method of claim 1, wherein the correlation between the at least two metadata assets is determined based on at least one of:
    (i) a combination of the at least one confidence weight and the relevance weight being equal to or greater than a threshold correlation;
    (ii) the at least one confidence weight being equal to or greater than a confidence threshold; or
    (iii) the relevance weight being equal to or greater than a correlation threshold.

5. The computer-implemented method of claim 1, further comprising:
    determining one or more second metadata assets based on the one or more first metadata assets, wherein each second metadata asset comprises one or more of: time metadata, geo-position metadata, geolocation metadata, people metadata, scene metadata, content metadata, object metadata, and sound metadata.

6. The computer-implemented method of claim 5, further comprising:
    determining one or more third metadata assets, wherein each third metadata asset is determined or inferred from one or more of: (i) the one or more first metadata assets and (ii) the one or more second metadata assets.

7. A non-transitory computer readable medium comprising instructions for generating a metadata network for digital asset management, which when executed by one or more processors, cause the one or more processors to:
    obtain a collection of metadata assets describing characteristics associated with digital assets (DAs) in a DA collection;
    identify one or more first metadata assets in the collection of metadata assets, wherein each first metadata asset comprises a moment;
    generate nodes in the metadata network to represent at least some of the metadata assets associated with the DA collection;
    determine, for at least two of the metadata assets, a correlation between the at least two metadata assets, wherein determining the correlation between the at least two metadata assets includes determining, for at least one of the at least two metadata assets, at least one confidence weight, wherein the at least one confidence weight is indicative of an estimated level of certainty that an element of one or more DAs has been properly identified by a corresponding metadata asset;
    determine, for at least one of the at least two metadata assets, a relevance weight, wherein the relevance weight is indicative of an importance of the at least one of the at least two metadata assets, and wherein the relevance weight is configured to change over time based, at least in part, on a number of detections of the at least one of the at least two metadata assets in the metadata network; and generate an edge in the metadata network between the nodes that represent the at least two metadata assets, the edge representing the determined correlation.

8. The non-transitory computer readable medium of claim 7, wherein each metadata asset describes at least one DA in the DA collection.

9. The non-transitory computer readable medium of claim 8, wherein each metadata asset describes a group of DAs in the DA collection.

10. The non-transitory computer readable medium of claim 7, wherein the correlation between the at least two metadata assets is determined based on at least one of:
(i) a combination of the at least one confidence weight and the relevance weight being equal to or greater than a threshold correlation;
(ii) the at least one confidence weight being equal to or greater than a confidence threshold; or
(iii) the relevance weight being equal to or greater than a correlation threshold.

11. The non-transitory computer readable medium of claim 7, wherein the instructions further comprise instructions, which, when executed by the one or more processors, cause the one or more processors to:
determine one or more second metadata assets based on the one or more first metadata assets, wherein each second metadata asset comprises one or more of: time metadata, geo-position metadata, geolocation metadata, people metadata, scene metadata, content metadata, object metadata, and sound metadata.

12. The non-transitory computer readable medium of claim 11, wherein the instructions further comprise instructions, which, when executed by the one or more processors, cause the one or more processors to:
determine one or more third metadata assets, wherein each third metadata asset is determined or inferred from one or more of: (i) the one or more first metadata assets and (ii) the one or more second metadata assets.

13. A processing system for generating a knowledge graph metadata network for digital asset management, comprising:
one or more processors configured to:
obtain a collection of metadata assets describing characteristics associated with digital assets (DAs) in a DA collection;
identify one or more first metadata assets in the collection of metadata assets, wherein each first metadata asset comprises a moment;
generate nodes in the metadata network to represent at least some of the metadata assets associated with the DA collection;
determine, for at least two of the metadata assets, a correlation between the at least two metadata assets, wherein determining the correlation between the at least two metadata assets includes determining, for at least one of the at least two metadata assets, at least one confidence weight, wherein the at least one confidence weight is indicative of an estimated level of certainty that an element of one or more DAs has been properly identified by a corresponding metadata asset;
determine, for at least one of the at least two metadata assets, a relevance weight, wherein the relevance weight is indicative of an importance of the at least one of the at least two metadata assets, and wherein the relevance weight is configured to change over time based, at least in part, on a number of detections of the at least one of the at least two metadata assets in the metadata network; and
generate an edge in the metadata network between the nodes that represent the at least two metadata assets, the edge representing the determined correlation.

14. The system of claim 13, wherein each metadata asset describes at least one DA in the DA collection.

15. The system of claim 14, wherein each metadata asset describes a group of DAs in the DA collection.

16. The system of claim 13, wherein the correlation between the at least two metadata assets is determined based on at least one of:
(i) a combination of the at least one confidence weight and the relevance weight being equal to or greater than a threshold correlation;
(ii) the at least one confidence weight being equal to or greater than a confidence threshold; or
(iii) the relevance weight being equal to or greater than a correlation threshold.

17. The system of claim 13, wherein the one or more processors are further configured to:
determine one or more second metadata assets based on the one or more first metadata assets, wherein each second metadata asset comprises one or more of: time metadata, geo-position metadata, geolocation metadata, people metadata, scene metadata, content metadata, object metadata, and sound metadata.

18. The system of claim 17, wherein the one or more processors are further configured to:
determine one or more third metadata assets, wherein each third metadata asset is determined or inferred from one or more of: (i) the one or more first metadata assets and (ii) the one or more second metadata assets.

* * * * *